(12) United States Patent
Nakamura

(10) Patent No.: US 7,809,681 B2
(45) Date of Patent: Oct. 5, 2010

(54) METHOD FOR ANALYZING DATA AND DATA ANALYSIS APPARATUS

(75) Inventor: Tomohiro Nakamura, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 373 days.

(21) Appl. No.: 12/081,483

(22) Filed: Apr. 16, 2008

(65) Prior Publication Data

US 2008/0263105 A1 Oct. 23, 2008

(30) Foreign Application Priority Data

Apr. 17, 2007 (JP) .............................. 2007-108447

(51) Int. Cl.
 *G06F 17/30* (2006.01)
(52) U.S. Cl. ...................... 707/610; 707/625; 707/648; 714/39; 455/414.3
(58) Field of Classification Search ................ 707/625, 707/648; 714/39; 455/414.3
See application file for complete search history.

(56) References Cited

U.S. PATENT DOCUMENTS

| | | | | |
|---|---|---|---|---|
| 4,852,095 A | * | 7/1989 | Meltzer | 714/737 |
| 5,471,631 A | * | 11/1995 | Beardsley et al. | 713/502 |
| 5,682,551 A | * | 10/1997 | Pawlowski et al. | 710/36 |
| 5,729,397 A | * | 3/1998 | Ottesen et al. | 360/69 |
| 5,774,716 A | * | 6/1998 | Harbinski et al. | 1/1 |
| 5,896,524 A | * | 4/1999 | Halstead et al. | 713/375 |
| 6,042,477 A | * | 3/2000 | Addink | 463/42 |
| 6,104,729 A | * | 8/2000 | Hellum et al. | 370/503 |
| 6,173,418 B1 | * | 1/2001 | Fujino et al. | 714/20 |
| 6,295,023 B1 | * | 9/2001 | Bloebaum | 342/357.06 |
| 6,530,023 B1 | * | 3/2003 | Nissl et al. | 726/26 |
| 6,718,476 B1 | * | 4/2004 | Shima | 713/400 |
| 6,728,880 B1 | * | 4/2004 | Sites | 713/178 |
| 6,903,683 B1 | * | 6/2005 | Nicholson | 342/357.09 |
| 7,072,912 B1 | * | 7/2006 | Verma et al. | 1/1 |
| 7,257,393 B2 | * | 8/2007 | Akiyama et al. | 455/414.3 |
| 7,328,384 B1 | * | 2/2008 | Kulkarni et al. | 714/725 |
| 7,587,398 B1 | * | 9/2009 | Fredricksen et al. | 1/1 |

(Continued)

FOREIGN PATENT DOCUMENTS

JP 11-027269 7/1997

(Continued)

OTHER PUBLICATIONS

Uma et al, Time-Normalization Techniques for Speaker-Independent Isolated Word Recognition, 1992, pp. 537-540.*

(Continued)

*Primary Examiner*—John R. Cottingham
*Assistant Examiner*—Sherief Badawi
(74) *Attorney, Agent, or Firm*—Stites & Harbison PLLC; Juan Carlos A. Marquez, Esq.

(57) ABSTRACT

When logs are analyzed, an analysis with consistency is carried out on the presumption that shifting occurs among time stamps of logs output from a plurality of apparatuses engaged in time correction amount. In a log analysis apparatus which receives logs from a plurality of computers for generating a plurality of logs for analysis, for the plurality of logs output from the plurality of computers, a time stamp recorded in each log is corrected based on a time correction log according to a consistency rule among the logs.

14 Claims, 18 Drawing Sheets

U.S. PATENT DOCUMENTS

| | | | |
|---|---|---|---|
| 7,644,308 B2 * | 1/2010 | Voigt et al. | 714/20 |
| 7,653,633 B2 * | 1/2010 | Villella et al. | 370/386 |
| 2002/0069299 A1 * | 6/2002 | Rosener et al. | 709/248 |
| 2003/0016167 A1 * | 1/2003 | Dooley et al. | 342/357.06 |
| 2004/0119639 A1 * | 6/2004 | Gilkes | 342/357.15 |
| 2005/0062643 A1 * | 3/2005 | Pande et al. | 342/357.1 |
| 2005/0228898 A1 * | 10/2005 | Evans | 709/231 |
| 2006/0225073 A1 * | 10/2006 | Akagawa et al. | 718/1 |

FOREIGN PATENT DOCUMENTS

| | | |
|---|---|---|
| JP | 2005-235054 | 2/2004 |
| JP | 2006-236251 | 2/2005 |
| JP | 2006-285875 | 4/2005 |

OTHER PUBLICATIONS

The Log Management Industry: An Untapped Market, Jun. 2006, pp. 1-20.*

Obouchi et al, Normalization of Time-Derivative Parameters Using Histogram Equalization, pp. 1-4.*

Chuck Harrison, An event-based AVB synchronization architecture, Feb. 8, 2007, pp. 1-15.*

Oxbeef, Time series normalization, Jul. 19, 2009, pp. 1-3.*

Elson et al, Time Synchronization for Wireless Sensor Networks, Apr. 2001, pp. 1-6.*

Richard C. Waters, Time Synchronization In Spline, Apr. 1996, pp. 1-17.*

* cited by examiner

TIME CORRECTION HISTORY 128

| TIME | TIME CORRECTION HISTORY TABLE ||
| | CORRECTION PLACE | CORRECTION |
| --- | --- | --- |
| 10:00:00.000 | COMPUTER 1 | - 50 msec |
| 10:01:00.000 | COMPUTER 1 | - 40 msec |
| 10:02:00.000 | COMPUTER 1 | - 60 msec |
| . . . | . . . | . . . |

511    512    513

TIME STAMP CORRECTION VALUE HISTORY TABLE 1102

| LOG | TIME STAMP CORRECTION VALUE HISTORY | |
|---|---|---|
| | LAST TIME STAMP | MINIMUM UPDATE UNIT |
| LOG 1 | 10 : 01 : 00.000 | 100 msec |
| LOG 2 | 10 : 01 : 00.000 | 10 msec |
| LOG 3 | 10 : 00 : 00.000 | 1 msec |
| ⋮ | ⋮ | ⋮ |

1111  1112  1113

METHOD FOR ANALYZING DATA AND DATA ANALYSIS APPARATUS

CLAIM OF PRIORITY

The present application claims priority from Japanese application P2007-108447 filed on Apr. 17, 2007, the content of which is hereby incorporated by reference into this application.

BACKGROUND OF THE INVENTION

This invention relates to a log analysis method or apparatus which monitors a system status or inquires into a problem by using a plurality of logs, and more particularly, to a method or an apparatus for correcting a time stamp recorded in a log by using a time correction log of an apparatus which has output the log, and a rule regarding time stamps of logs in order to correctly understand an event recorded in a log, and an order relation or correlation of monitor values etc., and to correctly determine the system status or a cause of the program.

Rendering services by using a cluster system which includes a plurality of computers such as a web 3-tier system (application system) has gained in popularity, increasing a necessity of continuously providing services stably by correctly understanding a progress status of a process carried out in the cluster system or an operation situation of the system. However, to understand the progress status of the process carried out in the cluster system including the plurality of computers or the operation situation of the system, only monitoring of an individual log output from each computer does not enable correct understanding of a situation of all the services or the entire system, so a plurality of logs output from the computers have to be analyzed en bloc.

However, there are a time lag among the computers and a shifting in recording timing among time stamps recorded in the logs. Thus, if the time stamp of each log is directly used for analysis, the analysis may not be correctly carried out. For example, a mistake such as changing of a processing order due to discordance among the logs, or appearance of a trend different from a true operation situation in statistical analysis result of the operation situation of the system due to a trend of shifting in time stamp among the logs may occur.

A true solution to the problem is elimination of the time lag among the computers to integrate timings of recording the time stamps in the logs. However, complete elimination of the time lag among the computers is difficult. Even if the time lag is completely eliminated, integration of timings of recording logs of all hardware and software components of the system is practically difficult, and analysis may not be correctly carried out if the time stamp recorded in the log is directly used for the analysis.

In response, a network time protocol (NTP) has been widely used to correct the time lag among the computers. Depending on environments, the time lag among the computers may be limited to several milliseconds to 100 milliseconds by using the NTP. However, for example, when a progress status of each process needs to be understood in detail, a method for accurately correcting time by milliseconds has to be provided. When time correction based on the NTP is highly frequently carried out by a large system, loads on a network increase. Depending on environments, the time lag of several tens of milliseconds still remains even if the time correction based on the NTP is highly frequently carried out, which may cause a problem of discontinuity of time caused by frequent time correction.

Concerning the problems, some conventional technologies have provided partial solutions.

JP 2005-235054 A entitled "Apparatus, Method, and Program for Correcting Time of Event Trace Data", discloses a method for correcting a relative time lag of event trace data among a plurality of computers based on an event send/receive relation. This conventional technology discloses a method for correcting a time lag among a plurality of logs based on the event send/receive relation. However, when time correction of an NTP is carried out during a period of measuring correction amount of the time lag, causing discontinuity in the amount of time lag, the time lag cannot be correctly corrected. Because the amount of correction for time lag is measured for all sent/received events, costs of time correction are high.

JP 2006-285875 A entitled "Computer System, Log Collection Method, and Computer Program", discloses a computer system which prepares a time difference table for storing a time difference between a virtual computer and a host computer, and corrects and takes out a time stamp of a log obtained from each virtual computer. This conventional technology discloses a method for updating a time difference between the computers at the time of changing time of each computer to correct a time stamp. However, time stamp correction is a time difference between the computers, and time stamp correction of a log caused by output timing of the log is not taken into consideration. Thus, consistency may not be obtained among the logs. When no correction of shifting other than at the time of changing time is carried out, and the shifting gradually enlarges, an error of time stamp correction amount gradually increases.

JP 2006-236251 A entitled "Time Stamp Apparatus, and Method and Program for Time Calibration", discloses a method for improving time reliability of a time stamp apparatus by using both of an electric wave clock and a time issue server such as an NTP. This conventional technology has been developed to prevent time alteration of an ill-intentioned user. The conventional technology discloses the method for improving reliability of time itself of a time stamp. However, this method cannot completely integrate times of time stamps. Additionally, as in the case of JP 2006-285875 A, correction of a time stamp caused by log output timing has to be taken into consideration separately.

JP 11-27269 A entitled "Clock Synchronization Method, Device and Recording Medium", discloses a method for carrying out time correction when, for clocks of a plurality of devices, a measuring result of each time difference is compared with statistical distribution of previous time differences, and there is a difference of a certain level or more. This conventional technology discloses a method for setting timing of correcting time of each device, but does not disclose time correction with consistency among logs taken into consideration.

SUMMARY OF THE INVENTION

An object of this invention is to realize a method or an apparatus for correcting a time stamp of a log to realize analysis having consistency when logs are analyzed on the presumption that shifting is present in time stamps of logs output from a plurality of apparatuses.

To realize analysis having consistency when logs are analyzed, a method for correctly recording time stamps per se of the logs is also conceivable. In other words, if a time lag among computers can be eliminated to integrate timings of recording time stamps in the logs, the time stamps don't have to be corrected.

For example, a method for reducing a time lag among the computers by the network time protocol (NTP) has been known. This method can reduce the time lag among the computers to several milliseconds to 100 milliseconds. However, for example, when a progress status of each process has to be understood in detail, a method capable of correcting time by milliseconds has to be provided. When time correction based on the NTP is carried out highly frequently in a large system, loads on a network increase. Depending on environments, a time lag of several tens of milliseconds still remains even if the time correction based on the NTP is carried out highly frequently. To the contrary, the frequent time correction may cause a problem of time discontinuity. The time lag among the plurality of computers generally tends to gradually increase/decrease, and shifting in time stamps of the plurality of logs also gradually increases/decreases. Thus, as a result of log analysis, because of this gradually increasing/decreasing tendency of shifting, a phantom that is not present by definition may emerge.

Integration of timings of recording time stamps is practically difficult to realize, because detection timing of an event to be recorded in a log or a monitor value has to be adjusted, and time necessary for obtaining time to be set as a time stamp has to be taken into consideration in hardware or software for outputting logs.

Accordingly, correct recording of a time stamp per se of a log is difficult, and analysis having consistency when logs are analyzed has to be realized on the presumption that shifting is present among time stamps of the plurality of logs.

A method for realizing log analysis having consistency without using any time stamp is also conceivable. For example, when a certain process is carried out for logs of events, in the case of recording where a plurality of events are generated in order, by integrally recording information of an event recorded immediately before a certain event, an order relation of the plurality of events is correctly recorded. If a time interval between events can be correctly recorded, log analysis having consistency can be realized. In practice, however, the log analysis having consistency is difficult to realize because the time lag among the computers has to be eliminated as described above. A mutual relation between events recorded through a plurality of processes cannot be recorded by this method. In other words, this method is effective as long as an essential order relation is present among processes, and the order relation can be recorded. However, the method cannot be used for events where no essential order relation is present among processes, and an order relation changes from timing to timing. In reality, however, detection of a problem occurring when an order relation among events having no essential order relation is set to a specific pattern is required of the log analysis, and correction of time stamps to eliminate shifting among the time stamps of the plurality of logs subjected to log analysis as much as possible is difficult to realize.

For example, in the case of understanding a progress status of a process in the web 3-tier system, the process is recorded in an access log of a web server and a query log of a DB server in this order, and thus a consistency rule is often present among logs.

Accordingly, an object of this invention is to realize analysis having consistency when logs are analyzed on the presumption that shifting is present among time stamps of logs output from a plurality of apparatuses where time correction is carried out based on an NTP or the like.

This invention provides a log analysis method for receiving, by a log analyze unit executed by a processor, logs including time stamps from a plurality of computers, and correcting the time stamps by the processor for executing the log analyze unit to analyze the logs, including the steps of: generating, by the plurality of computers, a first log including time correction amount and a time stamp at a time of correcting time; generating, by the plurality of computers, a second log including a time stamp in a log regarding a process or an operation; transmitting, by the plurality of computers, the first log and the second log; receiving, by the log analyze unit, the first log and the second log; storing, by the log analyze unit, the first log in a time correction history storage; calculating, by the log analyze unit, first time correction amount based on the first log; correcting, by the log analyze unit, the time stamp of the second log based on the first time correction amount and second time correction amount; determining, by the log analyze unit, whether, for a plurality of second logs whose time stamps have been corrected, a time-sequential order relation among the plurality of second logs satisfies a preset consistency rule; obtaining, when the time-sequential order relation among the plurality of second logs does not satisfy the preset consistency rule, by the log analyze unit, the second time correction amount from a difference among time stamps of the plurality of second logs; correcting the time stamps of second logs which do not satisfy the preset consistency rule again based on the first time correction amount and the second time correction amount; determining whether the second logs whose time stamps have been corrected again satisfy the preset consistency rule again; storing second logs which satisfy the preset consistency rule; and analyzing the stored second logs.

According to this invention, in the log analysis apparatus which receives logs from the plurality of computers for generating a plurality of logs for analysis, time stamps are corrected by using a consistency check result of the logs and a time correction log.

Each computer includes a plurality of logging units and a time correction unit for correcting time by a method such as an NTP. Logs including a time correction log are sent from the log send unit to the log analysis apparatus. Logs generated by the logging unit are operation logs, application logs, or system logs. Time stamps are added to these logs.

The log analysis apparatus receives logs from the plurality of computers by a log receive unit, and records the time correction log in the time correction history storage. For the other logs, a time stamp correction unit corrects time stamps by using a time stamp correction history table. Then, consistency checking is carried out for the time stamps of the logs based on the consistency rule. If discordance is detected, the time stamp correction history store unit is updated through a time stamp correction table update unit to correct the time stamps again. If consistency is detected, the logs are stored and analyzed, and a result of the analysis is output.

The time correction history storage is used for holding history of the time correction log by the method based on the NTP and implemented in each computer, and calculating a time lag tendency among the computers. For example, when correction is carried out to advance time by 1 second each time in a computer which corrects time every hour, the time is behind standard time by 0.28 milliseconds per second. During time correction, the time stamp correction history store unit is updated.

The consistency rule concerns consistency among the second logs. For example, when a certain process is carried out in order of the computers 1→2→3, time stamps are arrayed in order of 1→2→3 for the second logs output from the computers. The consistency rule includes a rule that a time difference of 1 second or more is present for the logs output from the computers 1 and 2 due to a network delay among the computers or processing time of each computer.

A discordance history storage holds a result of consistency checking for each log. In the case of discordance, the time stamp correction table update unit updates the time stamp correction history store unit by using a discordance history table. Then, time stamp correction is carried out all over again.

The time stamp correction history store unit holds history regarding time stamp correction and a change of correction per unit time, and corrects a time stamp of a log by the time stamp correction unit.

Thus, according to this invention, by correcting the time stamps recorded in the logs based on the time correction log and the consistency rule among the logs for the plurality of logs output from the plurality of computers, accuracy of the order relation among the plurality of logs can be improved, and a progress status of a process carried out in the computer and an operation situation of the system can be correctly understood. Especially, this invention can prevent discontinuity of the time stamps when time correction is carried out in the computer, or a phantom emerging in a statistical index due to time stamp shifting gradually increased/decreased among the plurality of logs.

DETAILED DESCRIPTION OF THE PREFERRED EMBODIMENTS

Hereinafter, the preferred embodiments of this invention will be described referring to the accompanying drawings.

First Embodiment

Figure 1:
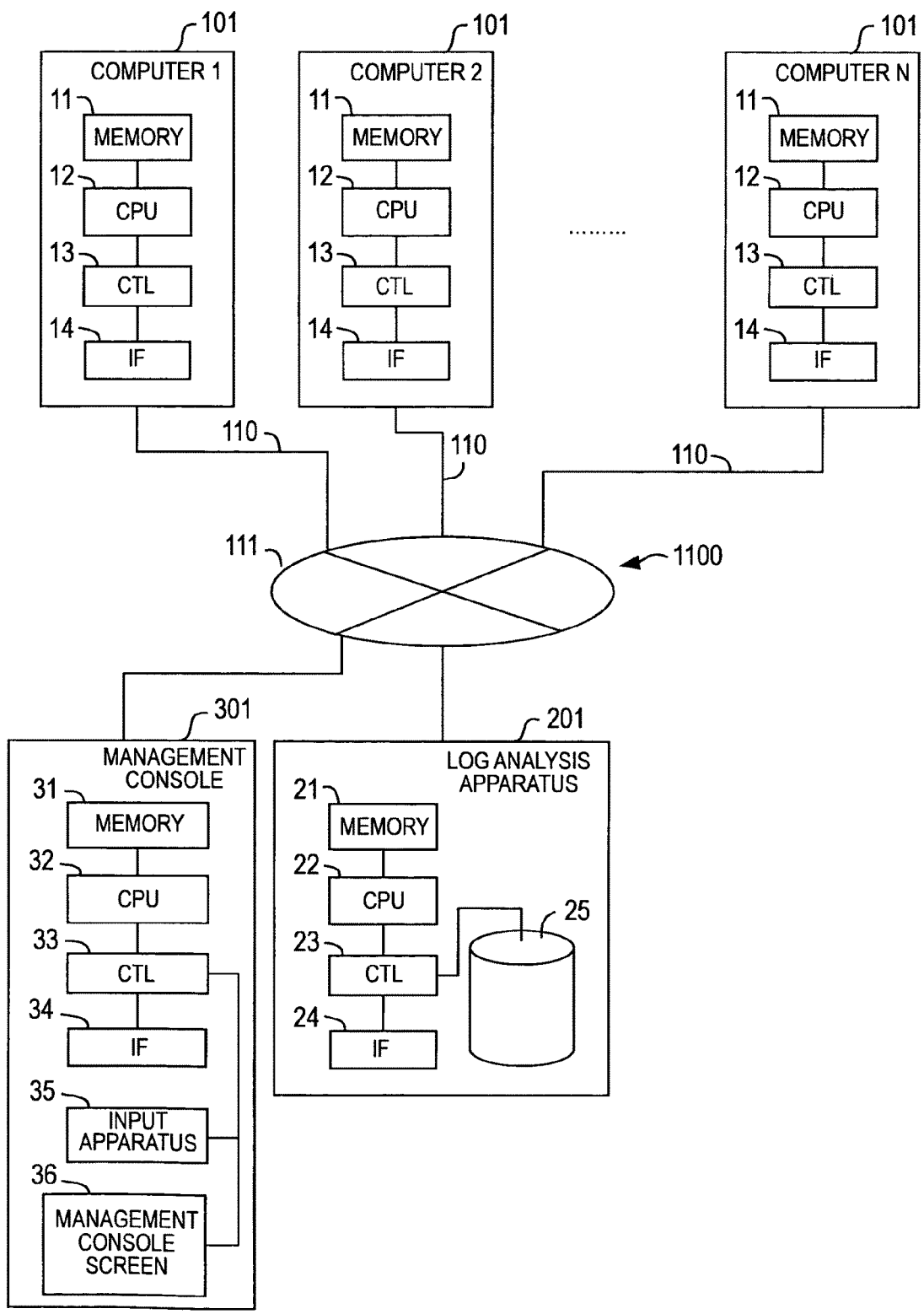
FIG. 1 is a block diagram illustrating a computer system to which this invention is applied according to a first embodiment of this invention.

FIGS. 1 to 16 illustrate a first embodiment of this invention. FIG. 1 is a block diagram illustrating a configuration of a computer system to which this invention is applied.

Referring to FIG. 1, in the computer system to which this invention is applied, a plurality of computers 101 of a cluster configuration are coupled to a network 1100, and a log analysis apparatus 201 that collects and analyzes logs output from the computers 101 is coupled to the network 1100. Each computer 101 includes a memory 11 for storing data or commands, a CPU (processor) 12 for executing an arithmetic operation, an interface 14 coupled to the network 1100, and a control unit 13 for controlling data between the CPU 12 and the interface 14. A storage system can be coupled to the control unit 13. The plurality of computers 101 (computers 1 to N) execute predetermined processes. For example, when a web 3-tier system is configured, the computer 1 operates a web server, the computer 2 operates an application server, and the computer N operates a database server.

Each computer 101 outputs a log from an executed application or OS, and sends the log to the log analysis apparatus 201 via the network 1100 which includes a signal line (log communication path) 110 and a network switch 111.

The log analysis apparatus 201 is a computer which includes a memory 21 for storing data or commands, a CPU 22 for executing an arithmetic operation, an interface 24 coupled to the network 1100, a control unit 23 for controlling data between the CPU 22 and the interface 24, and a storage system 25 for storing a result of an arithmetic operation or received data.

A management console 301 for managing a log output from each computer 101 and setting an operation of the log analysis apparatus 201 is coupled to the network 1100. The management console 301 includes a memory 31 for storing data or commands, a CPU 32 for executing an arithmetic operation, an interface 34 coupled to the network 1100, and a control unit 33 for controlling data between the CPU 32 and the interface 34. An input apparatus 35 and a management console screen 36 are coupled to the management console 301.

Figure 2:
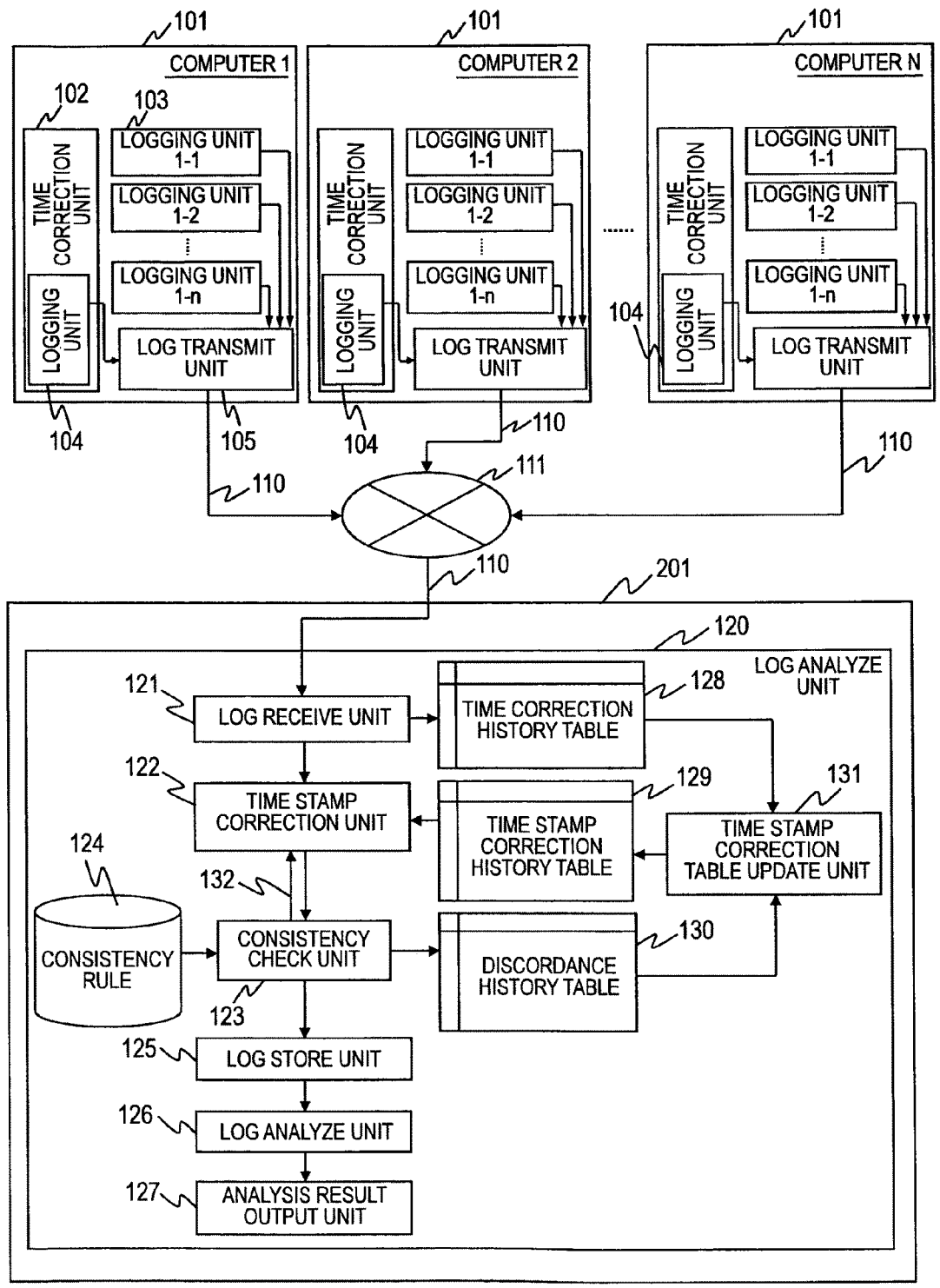
FIG. 2 is a block diagram illustrating a configuration of functional components of the computer system according to the first embodiment.

FIG. 2 is a block diagram illustrating functional components of the computer system shown in FIG. 1.

Each of the plurality of computers 101 includes a time correction unit 102 for matching time inside the computer 101 with reference time, at least one logging unit 103 for generating logs based on processing or an operation of an application or the OS, and a log send unit 105 for sending the logs generated by the logging unit 103 to the log analysis apparatus 201. The reference time used by the time correction unit 102 for time correction may be reference time provided from an apparatus (e.g., time server) not shown in FIG. 2, or reference time provided from any one of the computers 101 shown in FIG. 2. Alternatively, reference time provided from the log analysis apparatus 201 may be used. For time correction by the time correction unit 102, a method based on a network time protocol (NTP) may be used to correct time so that a time lag between the computer 101 and all or a part of the log analysis apparatus can be eliminated. The time correction unit 102 includes a time correction logging unit 104 for outputting a log of history when time correction is carried out.

The logging unit 103 generates various events which have occurred in the computer 101, a monitor value varied according to an operation situation, and history of changing operations as logs. Examples of logs generated by the logging unit 103 are an application log, a system log, and an operation log. The logs generated by the logging unit 103 and the time correction logging unit 104 are sent from the log send unit 105 through the log communication path 110 and the network switch 111 to the log analysis apparatus 201. In FIG. 2, only one log send unit 105 is shown for each computer 101. However, the computer 101 may include a plurality of log send units 105. Similarly, a plurality of log communication paths 110 and a plurality of network switches 111 may be provided. In FIG. 2, in the logging unit 103 of the computer 101, a logging unit 1-1 generates a log of the OS, and a logging unit 1-2 generates a log of an application.

The log analysis apparatus 201 includes a log analyze unit 120 for receiving logs output from the plurality of computers 101, and correcting time information of the received logs to analyze the logs. This log analyze unit 120 is loaded as a program in the memory 21 of the log analysis apparatus 201, and read in a cache memory of the processor 22 to be executed.

The log analyze unit 120 receives logs sent through the log communication path 110 by a log receive unit 121. The log receive unit 121 receives a time correction log generated by the time correction logging unit 104 of each computer 101, and a log generated by the logging unit 103 regarding an application or the OS.

A time correction history table 128 is for registering the time correction log generated by the time correction logging unit 104 and received by the log receive unit 121 for each computer 101. A time stamp correction unit 122 has a function of correcting a time stamp recorded in the log received by the log receive unit 121. A time stamp correction history table 129 is coupled to the time stamp correction unit 122 to be used for correcting a time stamp. A consistency check unit 123 has a function of checking whether a time stamp of a log corrected by the time stamp correction unit 122 satisfies a consistency rule 124 which presets a time-sequential order among logs. Between the consistency check unit 123 and the time stamp correction unit 122, a time stamp recorrection path 132 is set to correct the time stamp all over again when log discordance is discovered. A discordance history table 130 is for registering a result of consistency checking among the logs carried out by the consistency check unit 123. The logs passed through the consistency checking of the consistency check unit 123 are sent to a log store unit 125, a log analyze unit 126, and an analysis result output unit 127. FIG. 2 illustrates only an example of the processing order, so the processes may be simultaneously executed and a part thereof may be omitted.

A time stamp correction table update unit 131 has a function of registering information regarding time stamp updating of logs in the time stamp correction history table 129 by using pieces of information registered in the time correction history table 128 and the discordance history table 130. In FIG. 2, only one log analysis apparatus 201 is shown. However, a plurality of log analysis apparatuses 201 may be used, and the plurality of log analysis apparatuses 201 may share some functions of the log analyze unit 120. For example, the time correction history table 128 may be shared by the plurality of log analysis apparatuses 201 to use the same information.

The log processing of the computer system of this invention shown in FIG. 2 will be described below by using a flowchart of FIG. 3.

First, the logging unit 103 of each computer 101 generates an action log or an operation log (step 202). Concurrently, the time correction logging unit 104 of the time correction unit 102 of the computer 101 generates a time correction log (step 203). The logs and the time correction log are sent from the log send unit 105 of each computer 101 to the log analysis apparatus 201 through the log communication path 110 and the network switch 111 (step 204). The log analyze unit 120 of the log analysis apparatus 201 receives the sent log and time correction log by the log receive unit 121 (step 205). The log receive unit 121 determines a type of the received log, and the process proceeds to a step 206 in the case of an application or OS log, or to a step 207 in the case of a time correction log (step 2050). Then, two types of operations are carried out depending on types of logs.

Figures 6A, 6B:
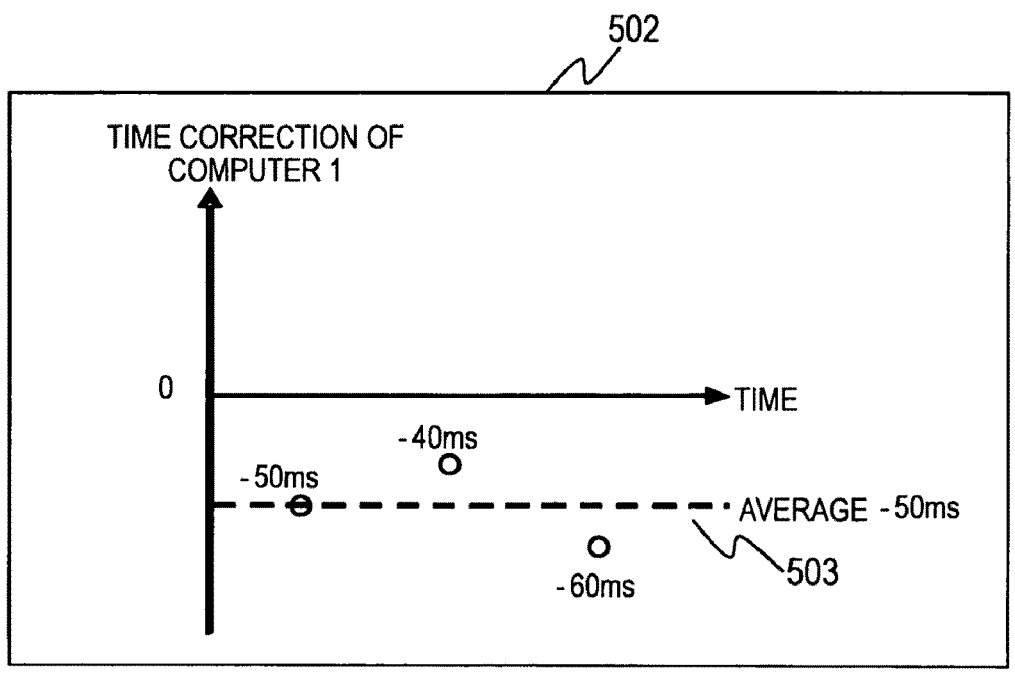
FIG. 6A is an explanatory diagram illustrating an example of a time correction history table according to the first embodiment.
FIG. 6B is a graph illustrating an example of a method for calculating time correction of a computer based on time correction history according to the first embodiment.

First, the time correction log generated by the time correction logging unit 104 is registered in the time correction history table 128 as shown in FIG. 6A described below (step 207). The time stamp correction table update unit 131 updates the time stamp correction history table 129 by using the time correction history tale 128 (step 211). The process is finished for the time correction log (step 215).

In the case of a log regarding an application or the OS other than a time correction log, first, the time stamp correction unit 122 corrects a time stamp of the log by using the time stamp correction history table 129 (step 206). The consistency check unit 123 checks consistency of the time stamp of the log according to the consistency rule 124 (step 208). A consistency checking result is registered in the discordance history table 130 (step 209). The time stamp correction table update unit 131 updates the time stamp correction history table 129 by using the discordance history table 130 (step 210). Whether log consistency is guaranteed as a result of consistency checking is determined. The process proceeds to a step 214 if the consistency is guaranteed. If the consistency is not guaranteed, the process returns to the step 206 to correct the time stamp again (step 212). If the consistency is guaranteed, the log store unit 125, the log analyze unit 126, and the analysis result output unit 127 stores and analyzes the log and outputs the result, respectively (step 214), and then the process is finished (step 215). For the storing and the analyzing of the log, and the outputting of the result (step 214), a part may be omitted or a processing order may be changed. The log analyze unit 126 analyzes a log whose time stamp has been corrected by a well-known statistical method. For example, the log analyze unit 126 analyzes response time or the like of each computer 101.

In branching of control based on the result of consistency checking (step 212), if there is no consistency, the process returns to correction of the time stamp (step 206) through the time stamp recorrection path 132 (step 213).

Figure 4:
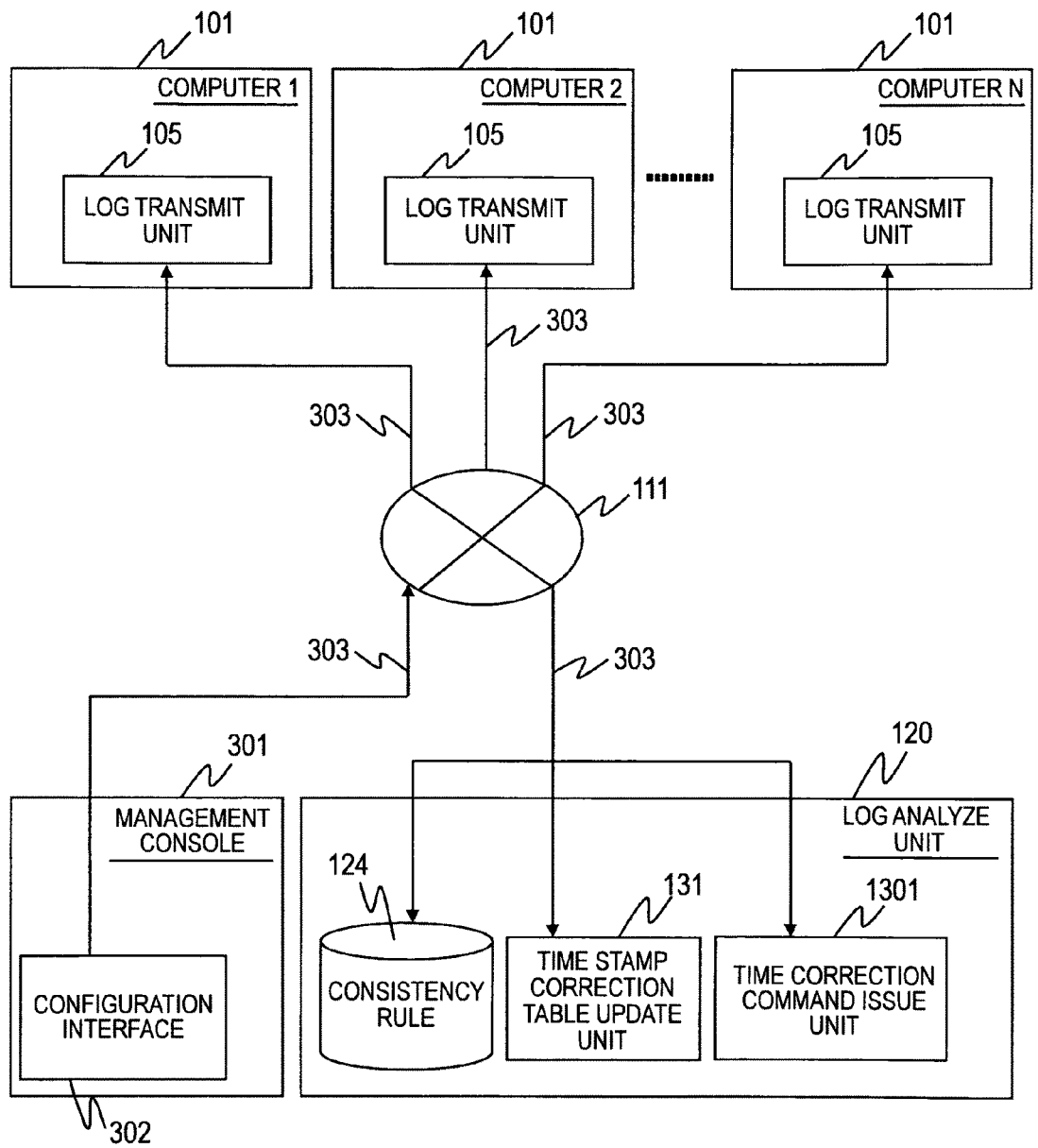
FIG. 4 is a block diagram illustrating a method for setting an operation from a management console according to the first embodiment.

FIG. 4 is a block diagram illustrating an interface portion for setting an operation of the log send unit 105 and the log analyze unit 120, taken out from the basic configuration of this invention shown in FIG. 2. The management console 301 has a function of setting an operation of the log send unit 105 of the computer 101, the consistency rule 124 of the log analyze unit, the time stamp correction table update unit 131, and a time correction command issue unit 1301, and includes a configuration interface 302. The management console 301 notifies operation setting to the computer 101 or the log analyze unit 120 through a setting communication path 303 and the network switch 111. In FIG. 4, the management console 301 is coupled to the computer 101 and the log analysis apparatus 201 via the network switch 111. However, a method for including a management console 301 in a certain computer 101 or log analysis apparatus 201, or disposing a management console 301 individually for each computer 101 and each log analysis apparatus 201 is also included.

Figure 5:
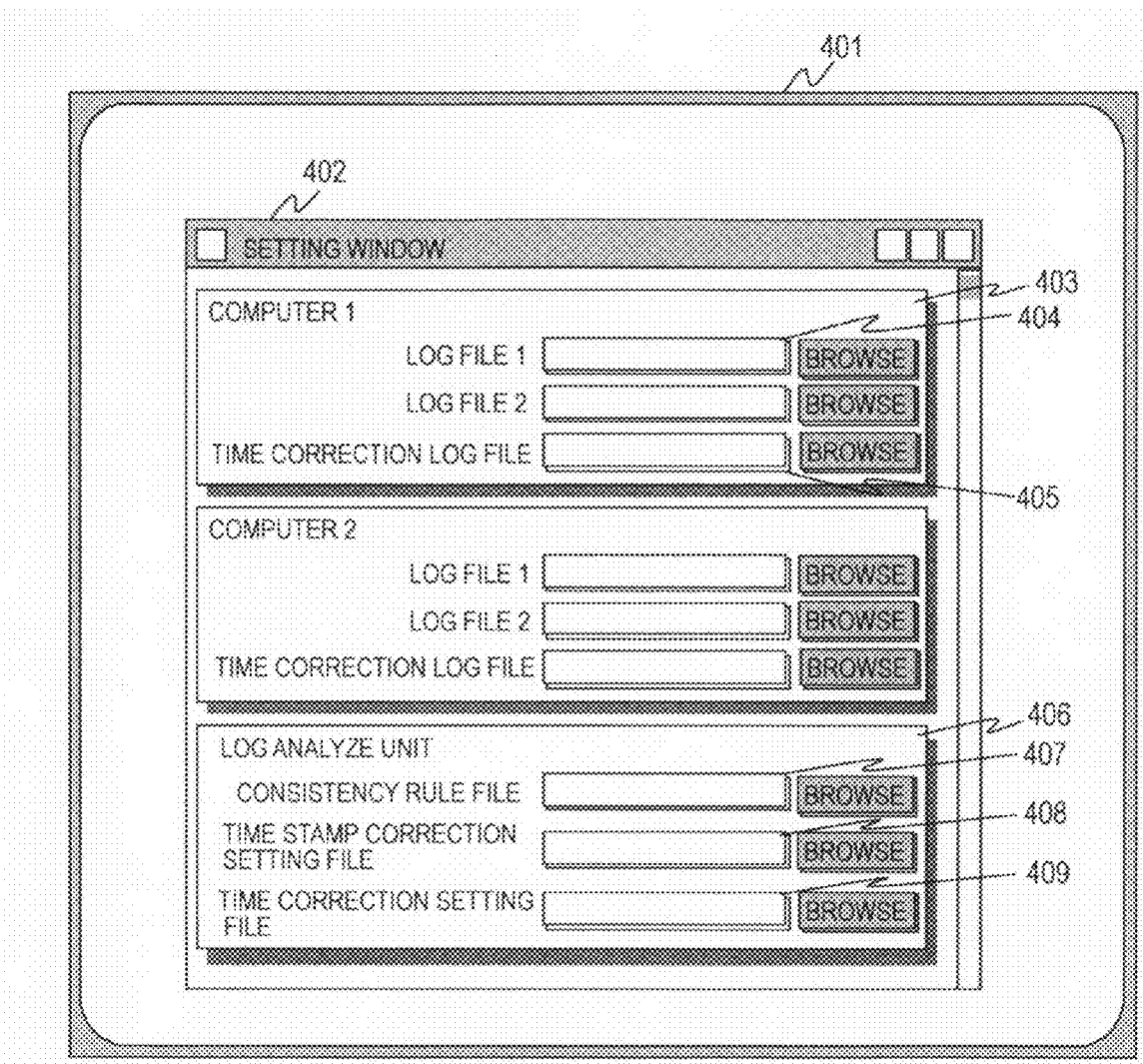
FIG. 5 is an explanatory diagram illustrating a setting screen of an interface for setting an operation according to the first embodiment.

FIG. 5 illustrates an example of the configuration interface 302 included in the management console 301 shown in FIG. 4. The management console 301 displays a setting window 402 in a management console screen 401 to set an operation. In the setting window (user interface) 402, items to be set for each computer 101 or each log analyze unit 126 are integrated. For example, items to be set for a computer 1 include interfaces 404 and 405 for designating a log file generated by the logging unit 103 and a time correction log file generated by the time correction logging unit 104, respectively.

Examples of items to be set for the log analyze unit 120 are interfaces 407, 408 and 409 for designating a consistency rule file to set a consistency rule 124, a time stamp correction setting file to set an operation of the time stamp correction table update unit 131, and a time correction setting file to execute setting regarding a time correction method, respectively. In addition to the interfaces for designating the setting files shown in FIG. 5, an interface for entering a numerical value and a button for setting processing ON/OFF (valid or invalid) are included in the configuration interface 302.

FIGS. 6A and 6B each illustrate the time correction history table 128 of the log analyze unit 120 and a time correction situation of the computer 101. Referring to FIG. 6A, a configuration example of the time correction history table 128 and recorded data will be described.

In FIG. 6A, the time correction history table 128 is for recording time 511 and time correction history for each computer 101. In the time correction history, correction amount 513 at a correction place 512 and the time 511 of outputting a time correction log is recorded. The recording in the time correction history table 128 is carried out as follows.

When the time correction unit 102 of the computer 101 carries out time correction, the time correction logging unit 104 generates a time correction log. In the time correction log, the time 511 and the correction place 512 of correcting time, and the correction amount 513 are recorded. As shown in FIGS. 2 and 3, these pieces of information are recorded in the time correction history table 128 via the log send unit 105, the log communication path 110, the network switch 111, and the log receive unit 121.

For the time 511, time immediately before (point of time of starting time correction) or after (point of time of completing time correction) time correction is carried out can be used. The correction amount 513 is time set forward or backward by the time correction. For the time 511, one of the times immediately before and after the time correction, and for the correction amount 513, which of positive and negative values is to be set in the case of the time set forward are respectively defined beforehand and the definition is integrated for all the time correction logs. If the integration is impossible, flags indicating meanings of the time 511 and the correction amount 513 have to be added in the time correction history table 128. According to the embodiment, correction is carried out to set backward the time 511 of the computer 101 when the correction amount 513 takes a negative value, and to set forward the time 511 of the computer 101 when the correction amount 513 takes a positive value.

The correction place 512 is a value or an identifier such as an IP address for specifying a computer 101.

Referring to FIG. 6B which illustrates a graph 502 indicating a relation between time and time correction amount, an example of a method for using the time correction history table 128 will be described.

In the graph 502, history of time corrections carried out three times by the computer 1 is plotted. In the drawing, an abscissa indicates time, while an ordinate indicates time correction amount of the computer 1. As shown in this example, the time correction amount is not necessarily constant, and a value fluctuates due to an error during time correction. Thus, an average 503 of a plurality of corrections is calculated as a time lag tendency of the computer 1 by the log receive unit 121 to be used for other processes. In this example, if the time 511 is time immediately before time correction, and the correction amount 513 is a positive value when the time is set forward, strictly, the time from time 10:00:00.000 to time 10:01:00.000 recorded in the time correction history table 128 is 1:00.050 in consideration of correction amount −50 milliseconds at time 10:00:00.000. In FIG. 6B, the average value 503 of the history of time corrections carried out three times is obtained. However, a method for using more histories or a maximum value in place of the average value may be employed. This operation setting can be set by the interfaces for setting the operations shown in FIGS. 4 and 5.

Figure 7:
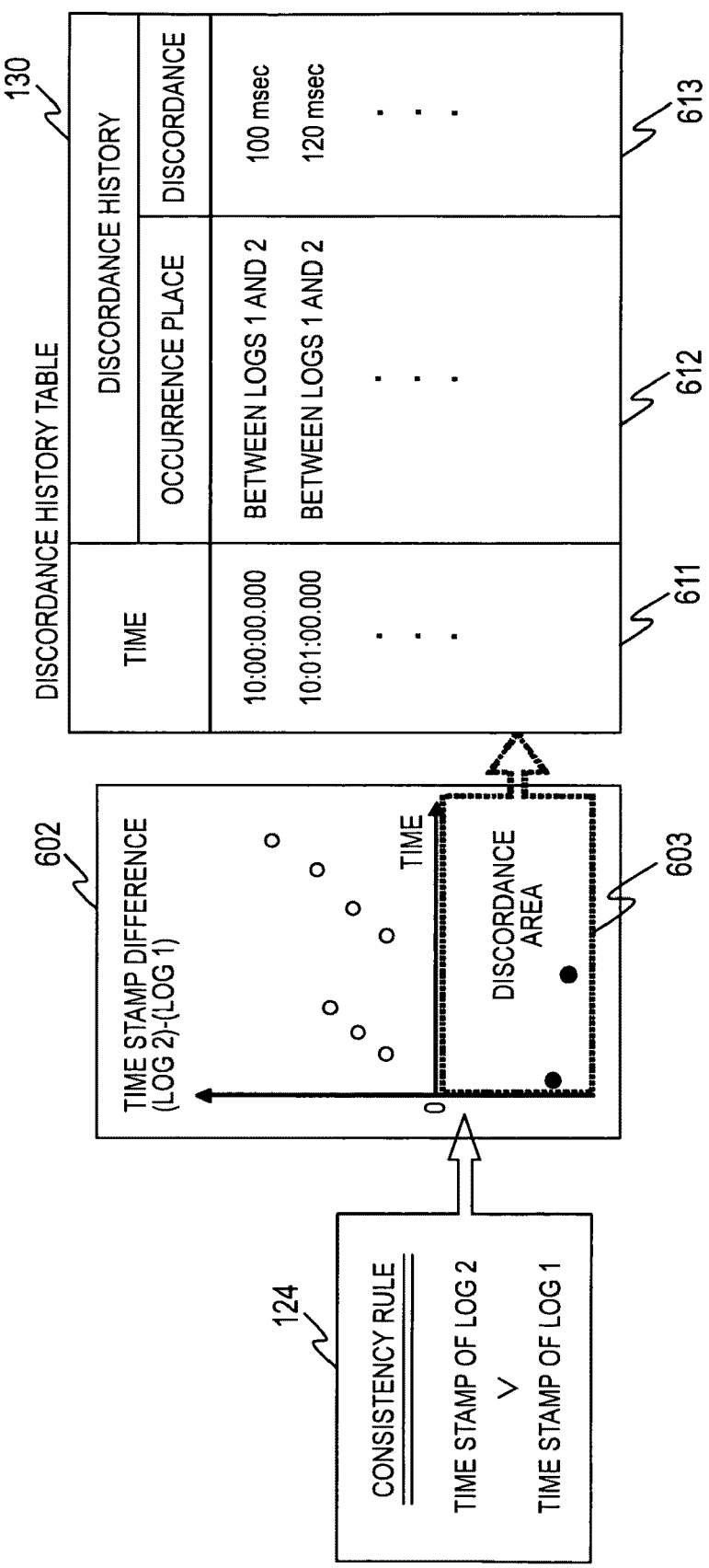
FIG. 7 is an explanatory diagram illustrating examples of a configuration of a discordance history table, a consistency rule, and consistency checking according to the first embodiment.

FIG. 7 illustrates an example of a consistency determining process mainly based on the consistency rule 124 and the discordance history table 130. Referring to FIG. 7, a configuration example and recorded data of the discordance history table will be described.

The discordance history table 130 of FIG. 7 is for recording time 611 and discordance history. In the discordance history, an occurrence place 612 and the amount of discordance 613 are recorded. The recording in the discordance history table 130 is carried out as follows.

In the log generated by the logging unit 103 of the computer 101, data indicating a place of generating a time stamp and the log, and event contents are recorded. As shown in FIGS. 2 and 3, the pieces of information arrive at the consistency check unit 123 via the log send unit 105, the log communication path 110, the network switch 111, the log receive unit 121, and the time stamp correction unit 122.

The consistency check unit 123 checks preset consistency among the logs according to the preset consistency rule 124. In the discordance history table 130, a consistency checking result is recorded by the consistency check unit 123. An example of the consistency rule 124 is a rule regarding an order relation among time stamps of the logs where a time stamp of the log 2 is after that of the log 1. In other words, when the log 1 is a received log of the web server and the log 2 is a query log of the DB server, the log 1 is generated upon reception of a data request from a client, and then the web server requests data to the DB server. The DB server processes the request to generate the log 2 after replying to the web server. Thus, because a time-sequential order is present among the logs of the computers, a consistency rule 124 is preset based on this time-sequential order relation. The shown example is a case where a consistency rule 124 indicating that the time stamp of the log 2 is larger than that of the log 1 (time recorded in the time stamp is later) is defined.

Referring to the exemplary graph 602 indicating a relation of a time stamp difference between the time and the log, an example of using the discordance history table 130 will be described. In this graph 602, a time stamp difference between the logs 1 and 2 calculated by the consistency check unit 123 is plotted. In the drawing, an abscissa indicates time, while an ordinate indicates a time difference obtained by subtracting the time stamp of the log 1 from that of the log 2. As shown in this example, the time stamp difference is not necessarily constant, and it may vary due to a time lag in the computer 101 or execution of time correction amount.

Based on the example of the consistency rule 124, in the graph 602, an area below the abscissa (difference=0) (area where the time stamp of the log 2 is before that of the log 1) becomes a discordance area 603 not matched with the consistency rule 124. When the time stamp difference enters the discordance area 603, the discordance history table 130 is used to set correction amount of the time stamp necessary for preventing discordance.

FIG. 7 illustrates recording of two discordance histories. A method for setting correction amount of the time stamp by using a maximum amount of discordance 613 as a reference, or a latest amount of discordance 613 as a reference is available. This operation setting can be set by the interfaces for setting the operations shown in FIGS. 4 and 5.

The time 611 recorded in the discordance history table 130 indicates time when discordance occurs among the logs. When a plurality of logs are involved with the discordance, information necessary for determining which of the logs the time concerns, or time of all the logs is recorded. In the amount of discordance 613, cases where positive or negative values should be set are defined beforehand to be integrated. If the integration is impossible, flags indicating meanings of the time 611 and the amount of discordance 613 have to be added in the discordance history table 130. For the amount of discordance 613, for example, the time stamp difference between the logs 1 and 2 which are discordant is set. In other words, the amount of a time stamp deviated from the consistency rule 124 becomes the amount of discordance 613. The occurrence place 612 is a value or an identifier such as an IP address or a log name capable of specifying a log.

Figure 8:
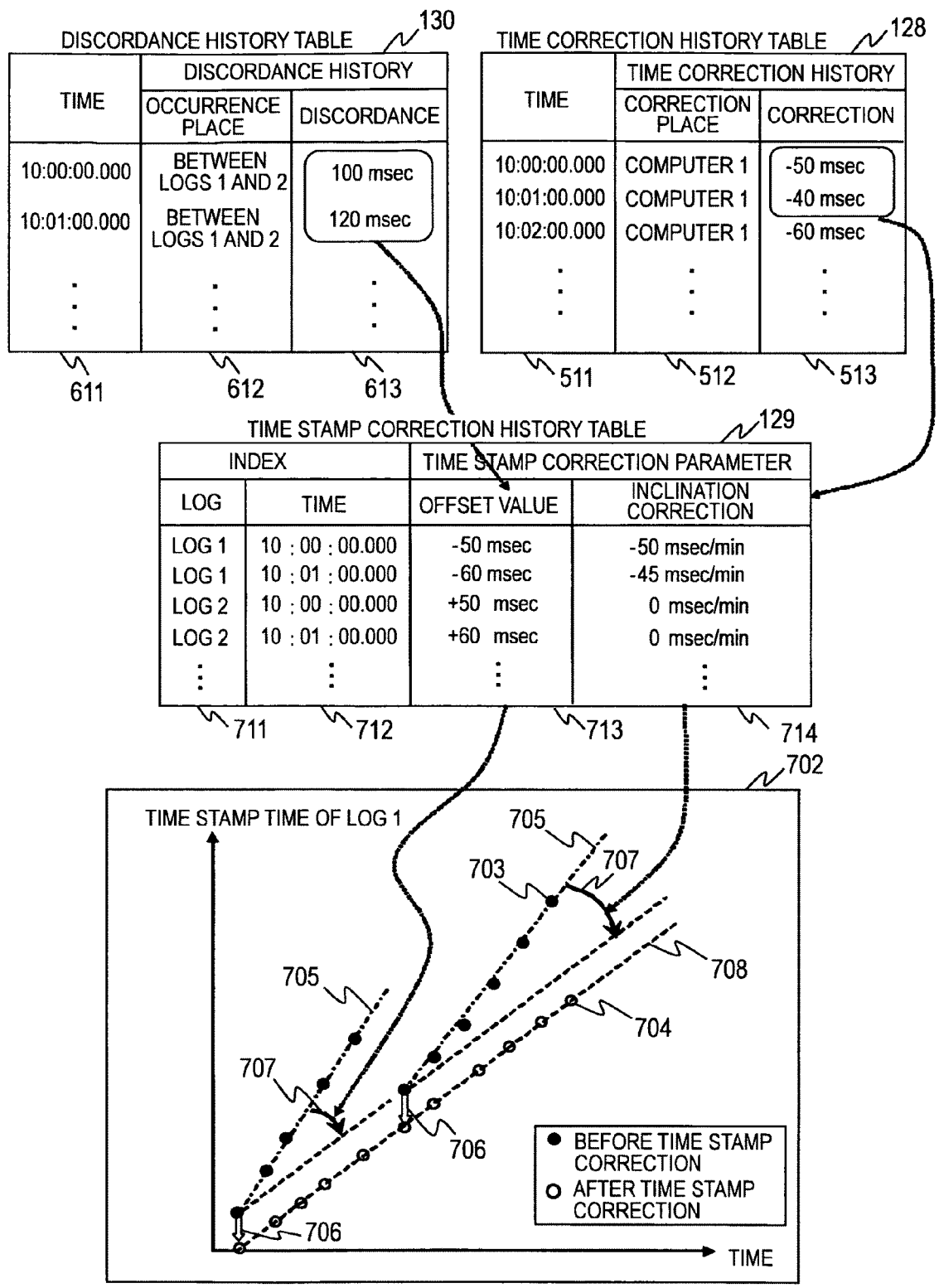
FIG. 8 is a diagram illustrating a configuration example of a time stamp correction history table and a graph of a time stamp correction method according to the first embodiment.

Referring to FIG. 8, a configuration example and recorded data of the time stamp correction history table 129 will be described.

The time stamp correction history table 129 includes an index and a time stamp correction parameter. The index includes an application destination log 711 of data recorded in the time stamp correction parameter and time 712 when the data becomes valid. The time stamp correction parameter is data necessary for correcting time stamps created by using the time correction history table 128 and the discordance history table 130. From the time correction history table 128, as described above referring to FIGS. 6A and 6B, a time lag tendency in the computer 101 is known from history of the time correction amount 513. Thus, this tendency is recorded as inclination correction amount 714 in the time stamp correction history table 129. From the discordance history table 130, as described above referring to FIG. 7, time stamp correction necessary for preventing the occurrence of discordance is known from the amount of discordance 613 when discordance occurs. Thus, this time stamp correction is recorded as an offset value 713 in the time stamp correction history table 129.

By using an example of a graph 702 indicating a relation between time and a time stamp of a log, an example of a method for using the time stamp correction history table 129 will be described.

In this graph 702, time stamps of the logs 1 are plotted. In the drawing, an abscissa indicates time, while an ordinate indicates the time stamp of the log 1. In the graph 702, a black circle point 703 is a time stamp of the log 1 before time stamp correction, and a white circle point 704 is a time stamp of the log 1 after time stamp correction. A chain line 705 is a straight line connecting a row of time stamps before time stamp correction, and a dotted line 708 is a straight line connecting a row of time stamps after time stamp correction. In the example of FIG. 8, a chain line 705 is discontinuous, which indicates that a time stamp has been rewound as a result of time correction carried out by the computer 101. A void arrow 706 indicates that a time stamp has been advanced by the offset value 713 based on the offset value 713 registered in the time stamp correction history table 129.

An arrow 707 indicates that inclination of the chain line 705 has been corrected based on the inclination correction amount 714 registered in the time stamp correction history table 129. The correction of the time stamp by inclination correction is reset when time correction is carried out. In other words, correction of the time stamp by inclination correction of time when the time correction is carried out is 0, and time stamp correction at a point of time advanced by unit time from the time correction is the inclination correction amount 714. As described above referring to FIGS. 6A and 6B, for the inclination correction amount 714, a value obtained by calculating an average value or a maximum value from one or more corrections recorded in the time correction, history table 128 by setting is used. As described above referring to FIG. 7, for the offset value 713, a value calculated from one or more amounts of discordance recorded in the discordance history table 130 is used.

Figure 9:
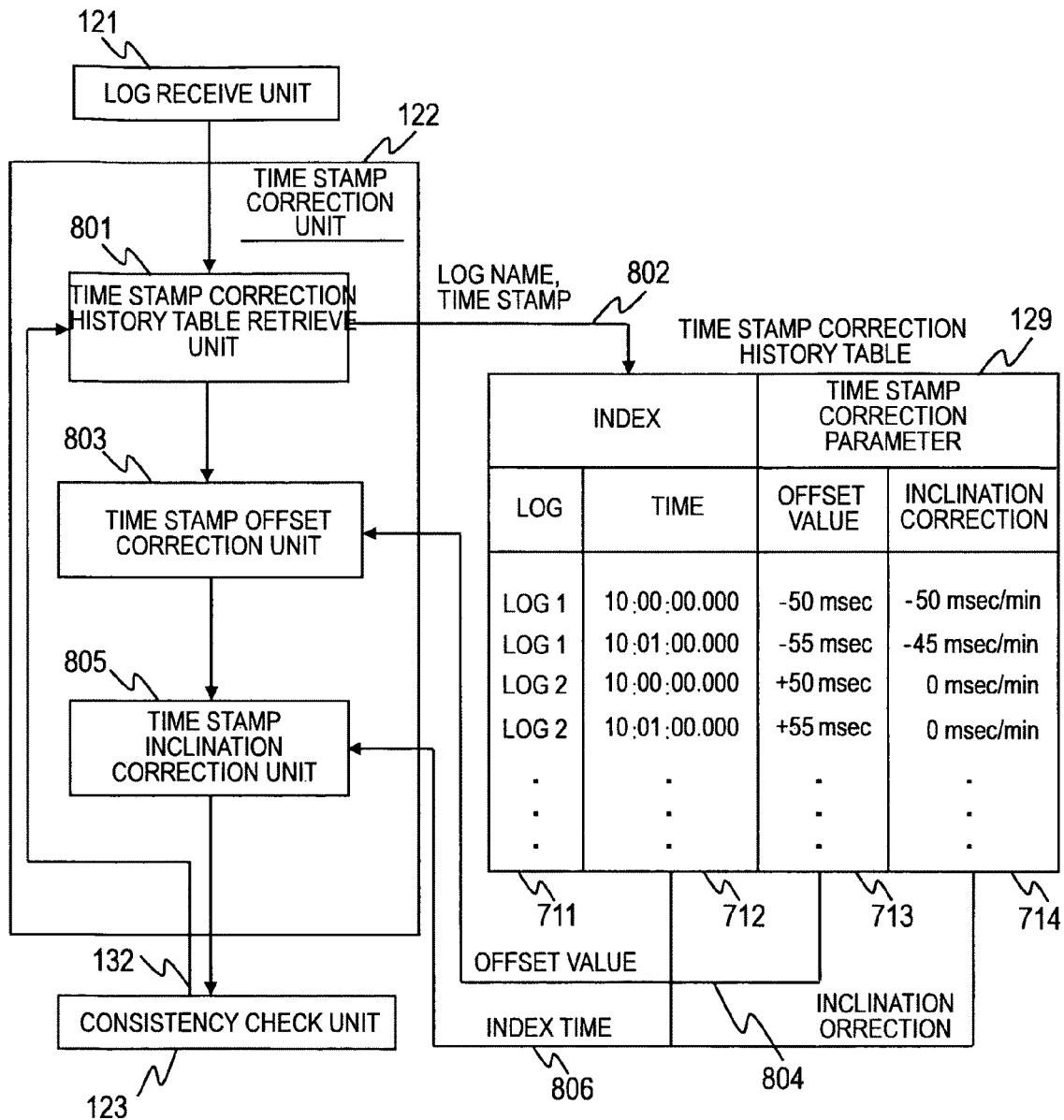
FIG. 9 is a block diagram illustrating a time stamp correction process according to the first embodiment.

Referring to FIG. 9, an operation of the time stamp correction unit 122 which corrects time stamps of logs by using the time stamp correction history table 129 will be described.

The time stamp correction unit 122 reads a log from the log receive unit 121, and retrieves an index of the time stamp correction history table 129 by the time stamp correction history table retrieve unit 801 based on the read log name and a time stamp (802). A log matched with a log 711 of the index is retrieved based on the log name, and time 712 of the index is retrieved based on the time stamp.

For retrieval of the time 712 of the index, time nearest and before time recorded in the time stamp is retrieved. When a relevant entry is found in the time stamp correction history table 129, a time stamp correction parameter of the entry is read. The time stamp correction parameter includes the offset value 713 and the inclination correction amount 714 which is correction per unit time.

The offset value 713 is sent to the time stamp offset correction unit 803, and the time 712 of the index and the inclination correction amount 714 are sent to the time stamp inclination correction unit 805. The time stamp correction unit 122 corrects, after the retrieval by the time stamp correction history table retrieve unit 801, time stamps of the logs read from the log receive unit 121 by the time stamp offset correction unit 803 and the time stamp inclination correction unit 805, and then sends logs to the consistency check unit 123. An order of processes of the time stamp offset correction unit 803 and the time stamp inclination correction unit 805 is not limited to the order shown in FIG. 9.

When time-sequential discordance occurs among logs in the consistency check unit 123, the logs are sent to the time stamp correction history table retrieve unit 801 of the time stamp correction unit 122 through the time stamp recorrection path 132, and the time stamps are corrected again.

Figure 10:
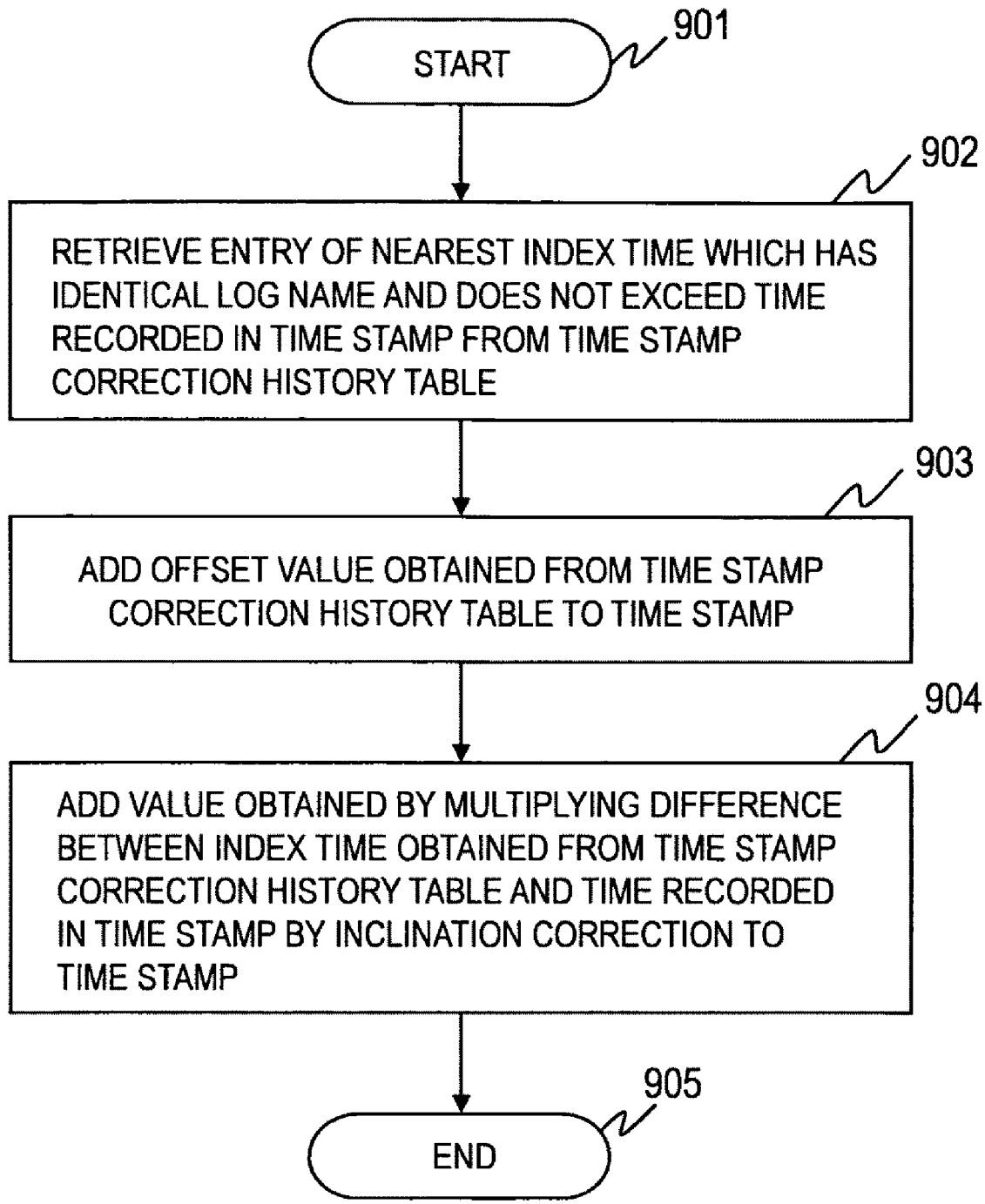
FIG. 10 is a flowchart illustrating the time stamp correction process according to the first embodiment.

FIG. 10 is a flowchart illustrating a method for correcting time stamps of logs through the processes shown in FIGS. 8 and 9. In the flowchart, only the time stamp correction unit 122 is extracted to be shown.

For a log whose time stamp is corrected, first, an entry of nearest index time 712 not exceeding time recorded in a time stamp by an identical log name is retrieved from the time stamp correction history table 129 (step 902). The offset value 713 obtained from the time stamp correction history table 129 is added to the time stamp (step 903). A value obtained by multiplying a difference between the index time 712 obtained from the time stamp correction history table 129 and the time recorded in the time stamp by the inclination correction amount 714 is added to the time stamp (step 904).

Thus, time stamp correction similar to that shown in the graph 702 of FIG. 8 can be carried out. Specifically, a time stamp correction method will be described referring to the example of FIG. 8. FIG. 8 illustrates the example of a method for correcting a time stamp of a log of time 10:01:00.000 of the log 1.

First, according to the step 902 of FIG. 10, an index of the time stamp correction history table 129 of FIG. 8 is retrieved to read a time stamp correction parameter of an entry of the log 1 of 10:01:00.000. As a result, the offset value 713 is −60 milliseconds, and the inclination correction amount 714 is −45 milliseconds per minute. In the example of FIG. 8, the offset value 713 is −60 milliseconds which is a result of halving the amount of discordance 120 milliseconds at 10:01:00.000 of the discordance history table 130 by the logs 1 and 2.

The inclination correction amount 714 is −45 milliseconds which is an average value of two time corrections amount 513 carried out at 10:00:00.000 and one minute after that and recorded in the time correction history table 128. In the step 903, the offset value 713 is added to the time stamp to set the time stamp to 10:01:39.940. Then, the step 904 is executed.

For the time stamp being corrected, as the time is advanced by 40 seconds from 10:01:00.000 which is the index time 712 read from the time stamp correction history table 129, −30 milliseconds obtained by multiplying −45 milliseconds per minute which is the inclination correction amount 714 by 40 seconds is added to the time stamp, and 10:01:39.910 becomes a time stamp after the correction.

Referring to FIGS. 11 to 14, a method for preventing rewinding of a time stamp will be described.

Figure 11:
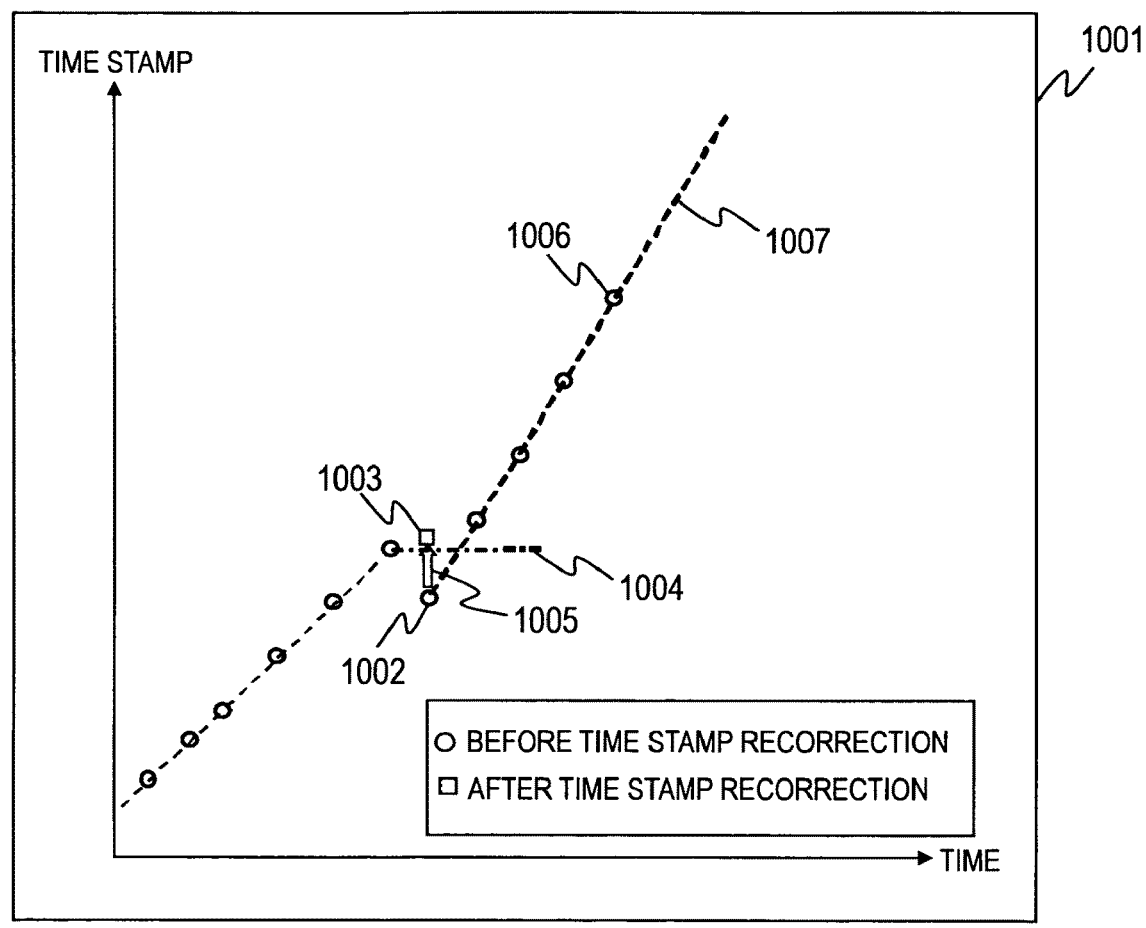
FIG. 11 is a graph illustrating a method for preventing time stamp rewinding according to the first embodiment.

FIG. 11 illustrates a graph 1001 which indicates a relation between time and a time stamp. A white circle point 1006 is a time stamp after the time stamp is corrected by the time stamp correction unit 122. In FIG. 11, this is set as a time stamp before time stamp recorrection.

In the drawing, a box 1003 is a time stamp after time stamp rewinding is prevented. In FIG. 11, this is set as a time stamp after time stamp recorrection. A broken line 1007 of the graph 1001 is a straight line connecting time stamps before time stamp recorrection, and a part thereof is discontinuous.

In an example of FIG. 11, the straight line 1007 is discontinuous because of rewinding of a time stamp to previous time. Such discontinuity may occur, for example, before/after time correction in the computer 101. A void arrow 1005 indicates that for a log 1002 whose time stamp has been rewound, the time stamp has been recorrected so as to prevent rewinding. To prevent rewinding of time, the time stamp has to be recorrected at time after a latest value 1004 of a time stamp of time before the time stamp 1002.

Figures 12, 13:
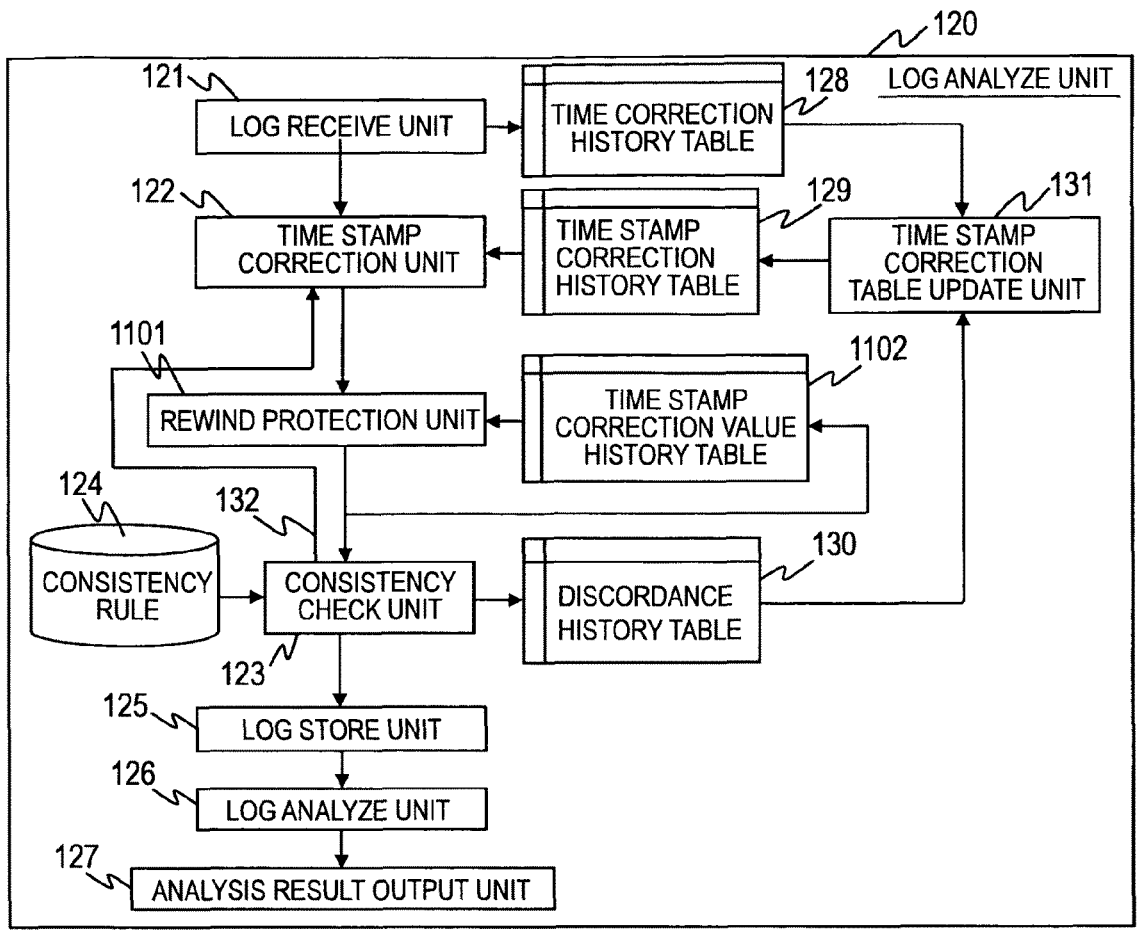
FIG. 12 is a block diagram illustrating another configuration of the computer system for preventing time stamp rewinding according to the first embodiment.
FIG. 13 is an explanatory diagram illustrating an example of a time stamp correction value history table according to the first embodiment.

FIG. 12 is a block diagram illustrating a method for preventing time stamp rewinding. FIG. 12 differs from the block diagram of FIG. 2 in that a rewind protection unit 1101 is added between the time stamp correction unit 122 and the consistency check unit 123, and a time stamp correction value history table 1102 used by the rewind protection unit 1101 is added. Others are similar to those of FIG. 2.

In the time stamp correction value history table 1102, as shown in FIG. 13, a log 1111 and time stamp correction value history are recorded. The time stamp correction value history includes a last time stamp 1112 and a minimum update unit 1113. The last time stamp 1112 is a latest time stamp of each log, and the minimum update unit 1113 is a minimum update range when time stamp rewinding is corrected. When rewinding is detected, by correcting a time stamp to time of adding the minimum update unit 1113 to the last time stamp 1112, the rewinding is prevented. In other words, correction is carried out to set a time stamp of a log of a correction target to time after a time stamp of a last log.

By setting the minimum update unit 1113 to 0, the same time as that of the last time stamp 1112 can be set. For the last time stamp 1112, a time stamp of a log after the time stamp is corrected is recorded by the rewind protection unit 1101. The minimum update unit can also be set by the interface for setting the operations shown in FIGS. 4 and 5.

Figure 14:
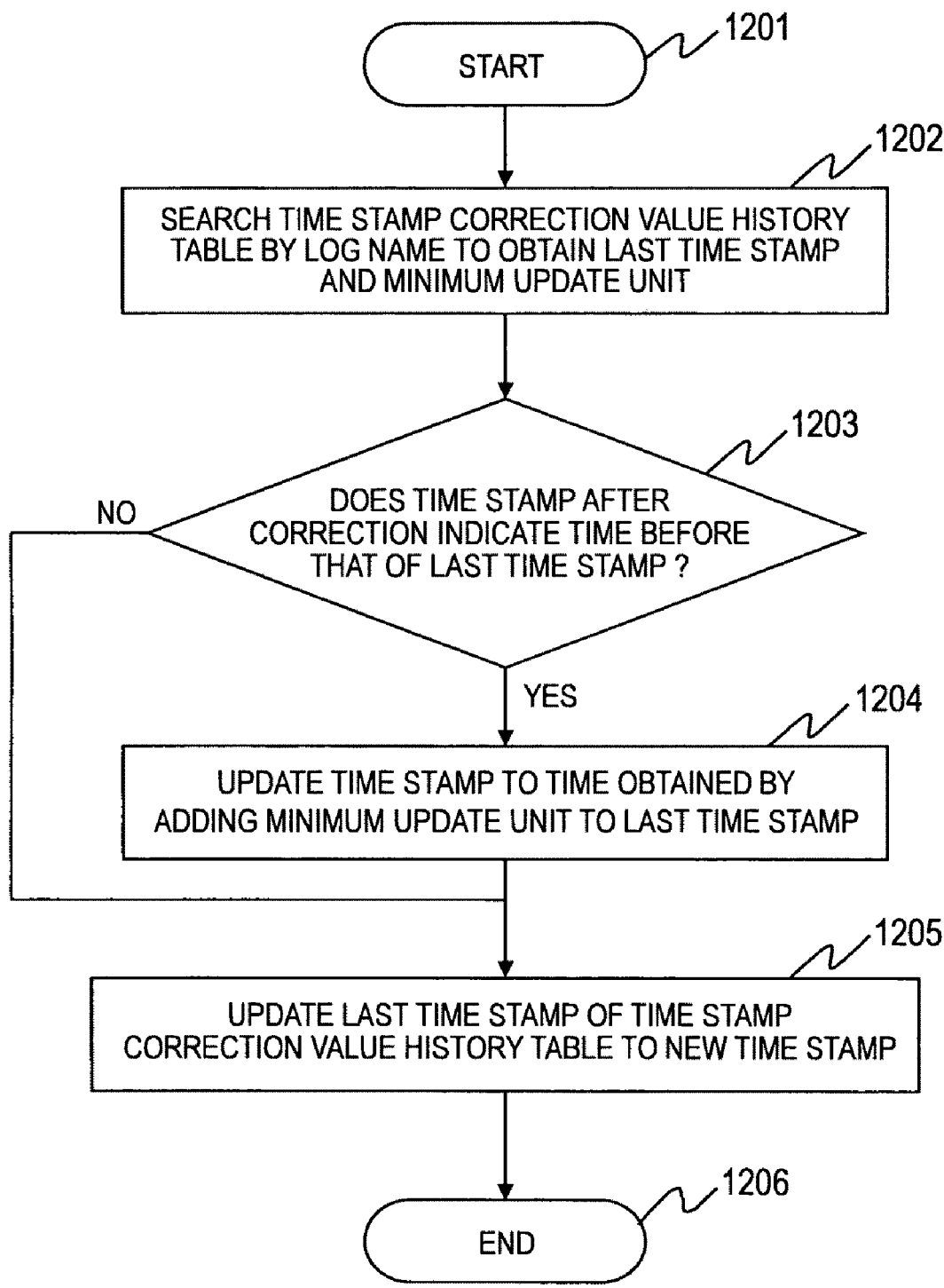
FIG. 14 is a flowchart illustrating an example a process for preventing time stamp rewinding according to the first embodiment.

FIG. 14 is a flowchart illustrating a method for preventing time stamp rewinding. In FIG. 14, only the rewind protection unit 1101 is extracted to be shown.

For a log whose time stamp is prevented from being rewound, first, the time stamp correction value history table 1102 is retrieved based on a log name to obtain the last time stamp 1112 and the minimum update unit 1113 (step 1202). The obtained last time stamp 1112 is compared with a time stamp which has been corrected by the time stamp correction unit 122 (step 1203).

If time of the corrected time stamp is before that of the last time stamp 1112, the time stamp is updated to time obtained by adding the minimum update unit 1113 to the last time stamp 1112 (step 1204). If time of the corrected time stamp is after that of the last time stamp 1112, the process proceeds to a step 1205. If the time stamp comparison of the step 1203 shows that the corrected time stamp and the last time stamp 1112 are equal in time, whether to execute the step 1204 of recorrection is determined according to setting. For example, in one of the settings, when the minimum update unit is 0, no recorrection is carried out if times are equal, and in other cases, recorrection is carried out. Lastly, the last time stamp 1112 of the time stamp correction value history table 1102 is updated by the recorrected time stamp (step 1205).

Thus, when the time of the computer 101 is corrected by time correction, the time stamp of the log can be prevented from being rewound to be set time-sequentially before the time stamp of the last log.

Figure 15:
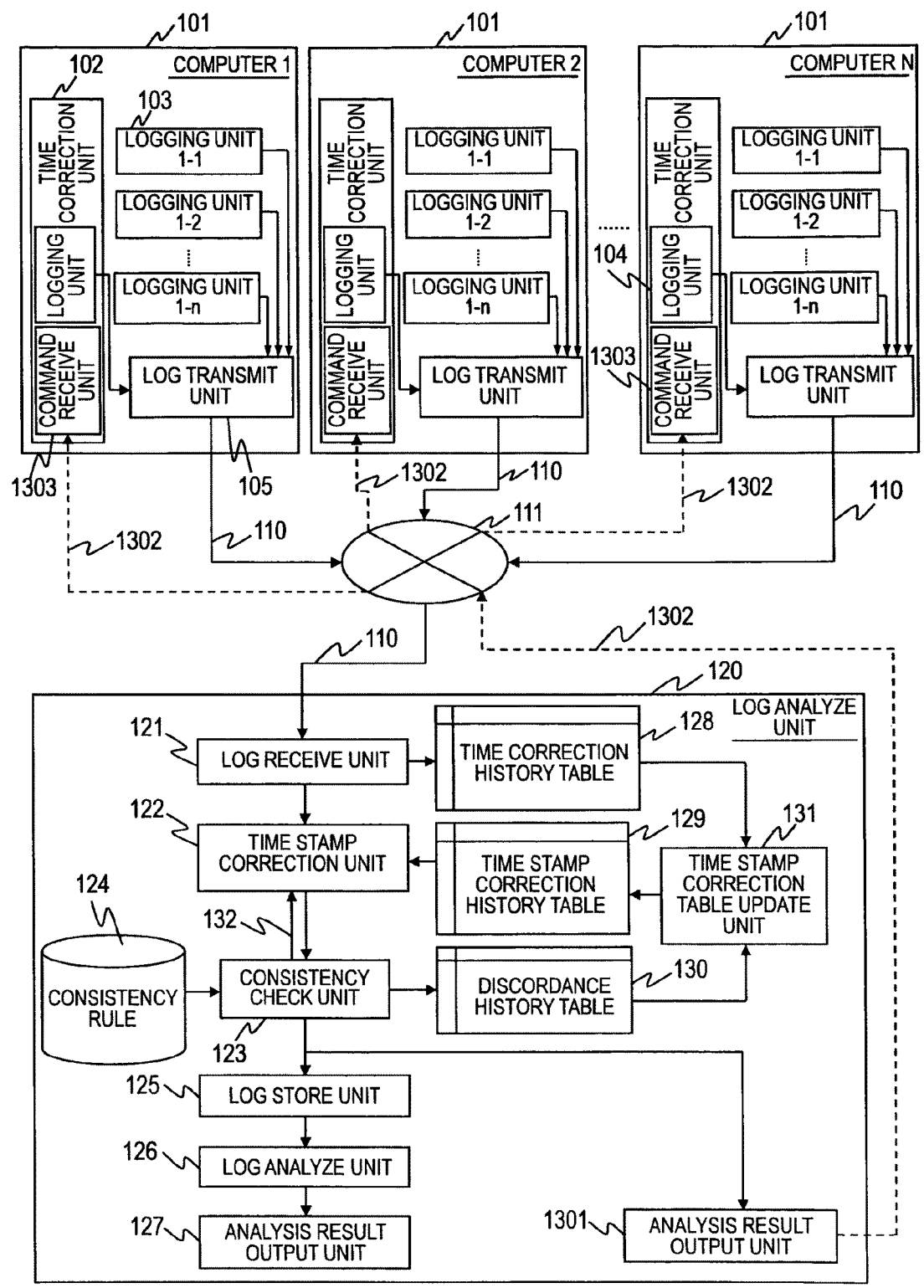
FIG. 15 is a block diagram illustrating another configuration of the computer system for correcting time at the time of log discordance according to the first embodiment.
Figure 16:
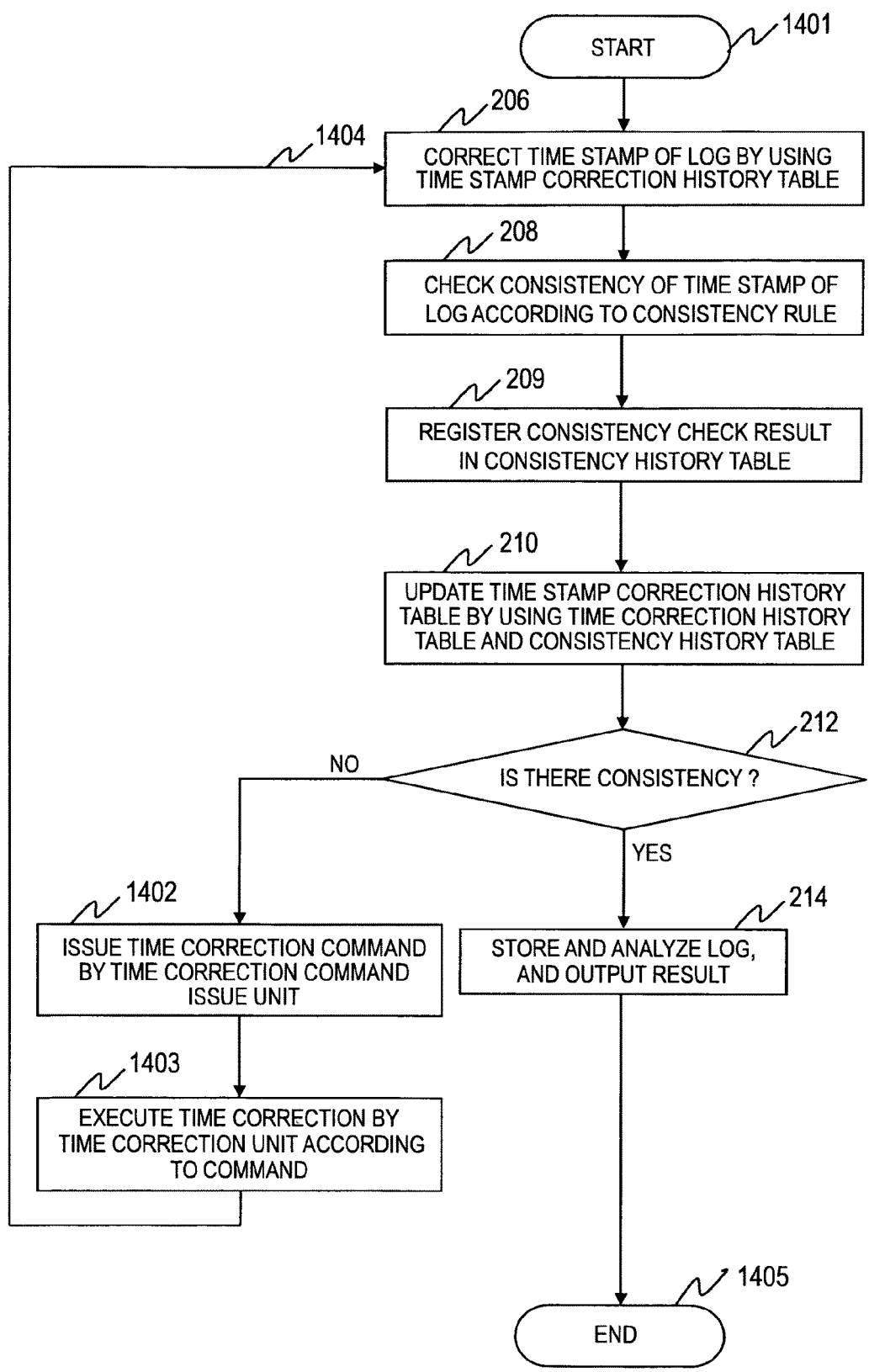
FIG. 16 is a flowchart illustrating an example of a process for correcting time at the time of log discordance according to the first embodiment.

Referring to FIGS. 15 and 16, a method for correcting time when discordance occurs will be described.

FIG. 15 is a block diagram illustrating the method for correcting time when discordance occurs. FIG. 15 differs from the block diagram of FIG. 2 in that a time correction command issue unit 1301 is added after the consistency check unit 123, a command receive unit 1303 is disposed in the time correction unit 102 of the computer 101, and a time correction command is communicated via the time correction command issue unit 1301, the time correction command communication path 1302, and the network switch 111. Other components are similar to those of FIG. 2.

The time correction command issue unit 1301 has a function of issuing a time correction command for controlling one or a plurality of computers 101 to execute time correction according to a checking result of the consistency check unit 123. The command receive unit 1303 disposed in the time correction unit 102 of the computer 101 has a function of receiving the time correction command issued from the time correction command issue unit 1301, and executing time correction by the time correction unit 102. Hint information of time correction according to the amount of discordance of a time stamp of a log can be added to the time correction command.

FIG. 16 is a flowchart illustrating the method for correcting time when discordance occurs. In the flowchart of FIG. 16, only a portion regarding a time correction command is extracted to be shown.

Figure 3:
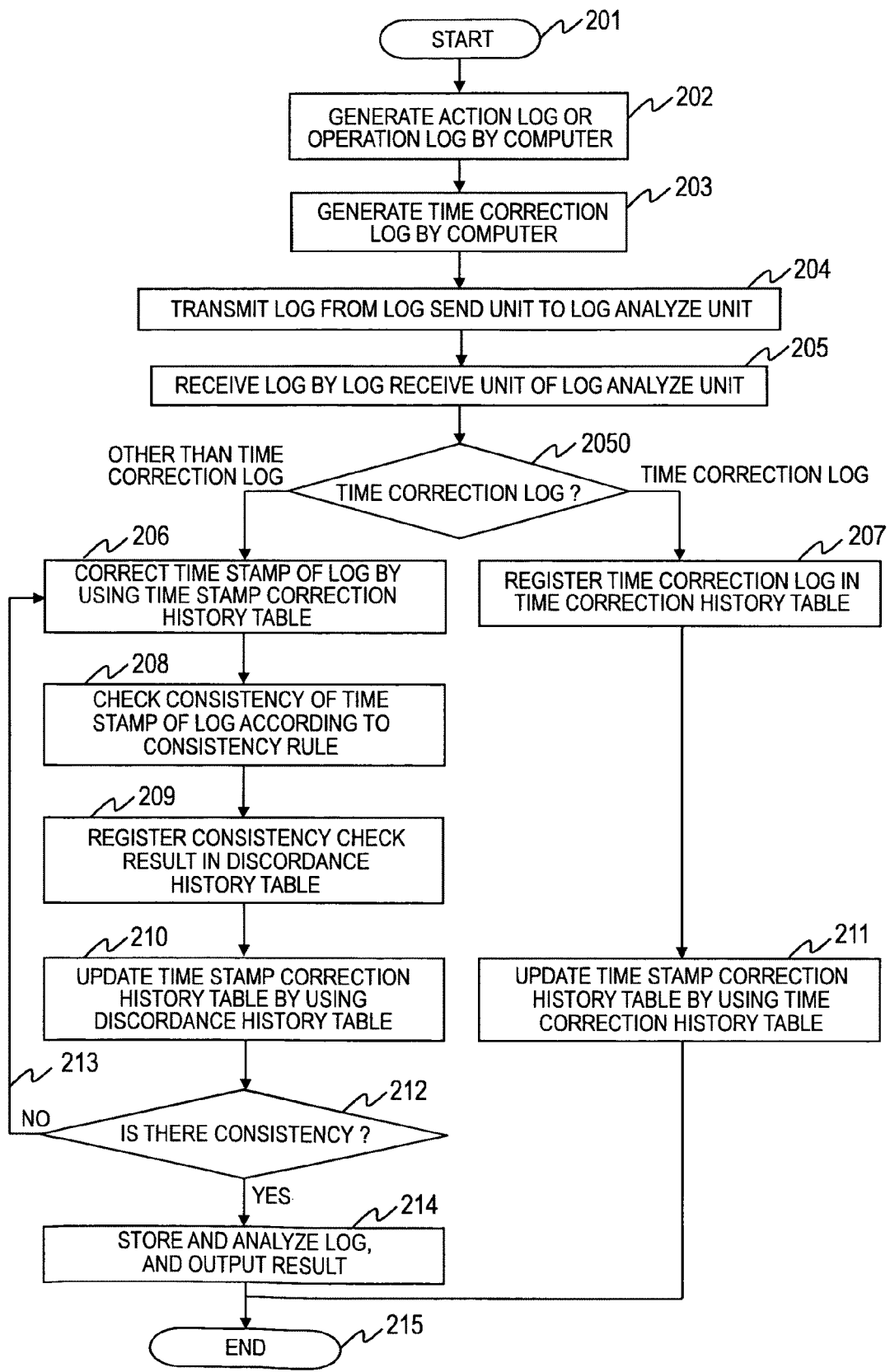
FIG. 3 is a flowchart illustrating a flow of a process carried out by the computer system according to the first embodiment.

In steps 206, 208, 209, 210 and 212 of FIG. 16, the process described referring to FIG. 3 is carried out. According to the method of FIG. 3, when the result of checking discordance among the logs of the step 212 shows discordance, the process returns to the step 206 to execute time stamp correction all over again. According to the method of FIG. 16, however, a time correction command is issued before time stamp correction is executed all over again.

First, the time correction command issue unit 1301 generates a command of executing time correction for the computer 101 which has output a log whose discordance has been found to send it through the time correction command communication path 1302 (step 1402). The time correction unit 102 executes time correction based on the time correction command received by the command receive unit 1303 (step 1403). Then, the process returns to the step 206 to execute time stamp correction all over again. The step 206 can be executed concurrently with the steps 1402 and 1403.

Figure 19:
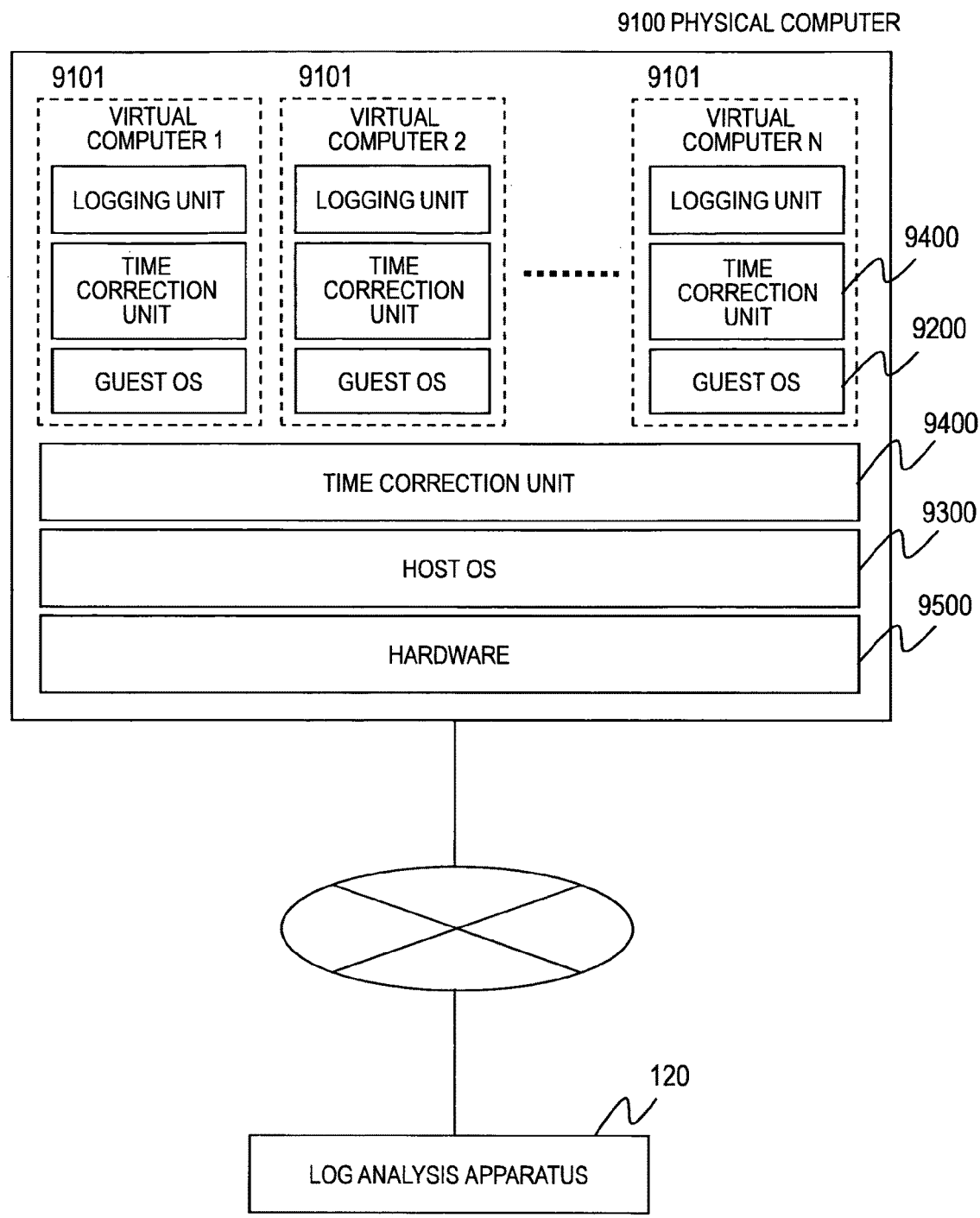
FIG. 19 is a block diagram illustrating an example of another configuration of the computer system using a virtual computer according to the first embodiment of this invention.

The computer 101 and the log analyze unit 120 have been described as separate functional blocks. However, a case where all or some functions are executed by a virtual computer operating in the same physical computer is also within this invention. As a realization example of a virtual computer, as shown in FIG. 19, when a plurality of guest OS's 9200 simultaneously operate in a host OS 9300 operating in a physical computer 9100, and each guest OS 9200 corresponds to a virtual computer 9101, a relation may be present between the time of the host OS 9300 and that of the guest OS 9200. Accordingly, not only a time correction unit 102 is present for each computer 101 as shown in FIGS. 2 and 15, but also a time correction unit 9400 which has influences over a plurality of virtual computers 9101 is included.

The embodiment described above shows a configuration where the log analyze unit 120 is independent of the computer 101 (computers 1 to N) for generating logs. However, the log analyze unit 120 may be included in the computer 101.

The log analyze unit 120 includes the log receive unit 121, the time stamp correction unit 122, the consistency check unit 123, the consistency rule 124, the log store unit 125, the log analyze unit 126, and the analysis result output unit 127. However, the log store unit 125, the log analyze unit 126, and the analysis result output unit 127 may be executed by another computer.

As described above, for the plurality of logs output from the plurality of computers 101, by collecting time correction logs and logs regarding the process, and correcting the time stamps recorded in the logs based on the preset consistency rule among the logs, accuracy of the order relation among the plurality of logs can be improved, and a progress status of the process carried out in the computer 101 or the cluster system and an operation situation of the system can be correctly understood. Especially, a phantom emerging in the statistical index based on the logs due to discontinuity generated in the time stamps when the time correction is carried out by the computer 101 or shifting of the time stamps gradually increased/decreased among the plurality of logs can be prevented.

The example where the plurality of computers 101 are formed into cluster configuration is described. Not limited to this, however, this invention can be applied to a case of analyzing the process or the operation executed by the computer 101 based on the logs. Especially, a user unaccustomed to matching time of the computer 101 with the reference time can accurately analyze consistency among the logs by this invention when a process or an operation is analyzed based on the logs.

Second Embodiment

Figure 17:
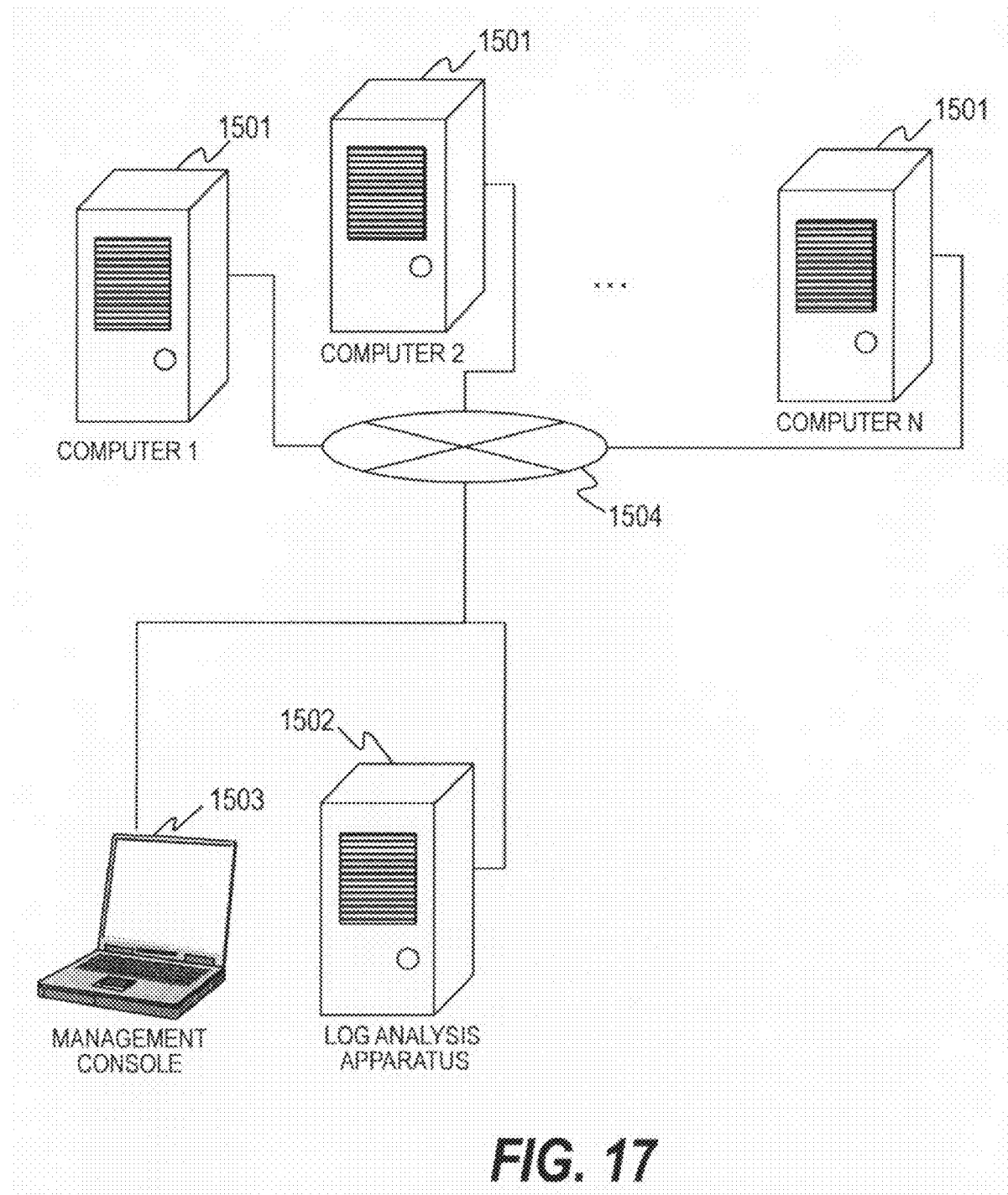
FIG. 17 is a block diagram illustrating a configuration of a log analysis apparatus, a management console, and a computer according to a second embodiment of this invention.
Figure 18:
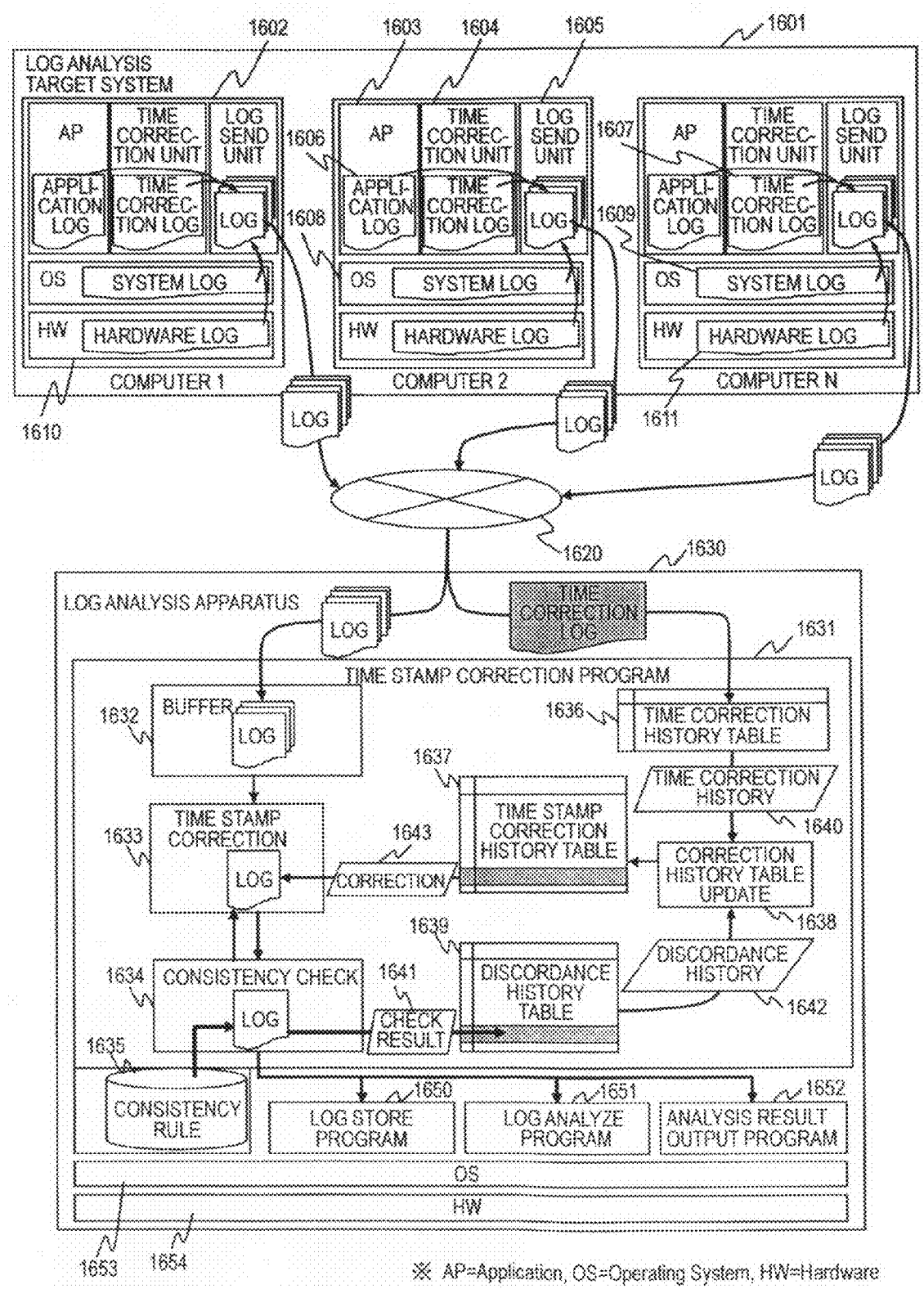
FIG. 18 is a block diagram illustrating another configuration of the log analysis apparatus according to the second embodiment.

Referring to FIGS. 17 and 18, a log analysis apparatus according to a second embodiment of this invention will be described.

FIG. 17 is a block diagram illustrating a computer system according to the second embodiment of this invention. The computer system of FIG. 17 includes at least one computer 1501, a log analysis apparatus 1502, a management console 1503, and a network 1504.

In FIG. 17, the log analysis apparatus 1502 and the management console 1503 are coupled to the network 1504 as apparatuses separate from the computer 1501. However, these apparatuses may be present in the computer 1501, and a network for interconnecting the log analysis apparatus 1502 and the management console 1503 may be independent of a network for interconnecting the computer 1501 and the log analysis apparatus 1502. The computer 1501 generates logs, and the log analysis apparatus 1502 collects and analyzes the logs generated by the computer 1501. All or some apparatuses included in this system have functions of correcting own time to match time with a reference time. They also have functions of outputting time correction logs during time correction. The reference time is time of any one of the apparatuses included in the system or an external apparatus. Time is corrected via the network 1504.

In FIG. 17, the apparatuses include different hardware components. However, all or some of the apparatuses may operate in the same hardware. Each apparatus may operate in a virtual computer. The management console 1503 is an apparatus for setting operations of the computer 1501 and the log analysis apparatus 1502, and has functions of setting operation time of the time correction function and a reference time described above, a file of a log or a time correction log analyzed by the log analysis apparatus 1502, and a method for correcting time stamps of logs.

Referring to FIG. 18, operations of the log analysis apparatus and the log analysis target system will be described.

This system includes a log analysis target system 1601, a log analysis apparatus 1630, and a network 1620 for interconnecting them. The log analysis target system 1601 includes one or more computers 1602. Each computer 1602 includes hardware (HW) 1610, an operating system (OS) 1608 operating in the hardware, an application (AP) 1603 operating in the OS, a time correction unit 1604, and a log send unit 1605. In FIG. 18, the number of applications 1603 is only one. However, the plurality of applications may operate, and the plurality of log send units 1605 may operate for each application. The computer 1602 may be a virtual computer, and the application 1603, the time correction unit 1604, and the log send unit 1605 may operate in a guest OS of a host OS.

As shown in FIG. 18, each unit of the computer 1602 outputs a log. The hardware 1610 outputs a hardware log 1611 recording a monitor value such as a free capacity of a memory or a use rate of a CPU, or event information such as a hardware error. The OS 1608 outputs a system log 1609 recording a monitor value such as the number of processes or the number of interruption times, or event information such as an occurrence of exceptions or an abnormal end of a process. The application 1603 outputs an application log 1606 recording an execution situation of an application. The time correction unit 1604 outputs a time correction log 1607 recording time correction when time is corrected. The log send unit 1605 has a function of collecting these logs to send them to the log analysis apparatus 1630 via the network 1620.

Time stamps indicating generation of information recorded in the logs or recording time are added to the logs sent from the log send unit 1605, and information for specifying a generating or recording place (computer) is also added. As a method for recording place information, for example, an IP address of the computer 1602, a log name unique to each log, or a host name unique to each computer 1602 is used. Timing of collecting logs, a method for collecting file names of logs to be collected, and a sending method of sending intervals, by the log send unit 1605, can be set by the management console.

The log analysis apparatus 1630 includes an operating system (OS) 1653 operating in the hardware 1654, and various programs operating in the OS 1653. Various programs may include, in addition to a time stamp correction program 1631, a log store program 1650, a log analyze program 1651, and an analysis result output program 1652 shown in FIG. 18, an application and a time correction unit. The log store program 1650, the log analyze program 1651, and the analysis result output programs 1652 may be partially omitted, a plurality thereof may be integrated into one program, or they may be included as parts of the time stamp correction program 1631. The time stamp correction program includes a plurality of program modules.

First, various logs sent from the log send unit 1605 to the log analysis apparatus 1630 via the network 1620 are stored in a log buffer 1632. In FIG. 18, the time correction log is directly sent from the network 1620 to the time correction history table 1636. However, a method for recording the time correction log in the log buffer 1632 and then recording it in the time correction history table 1636 may be employed. The time correction history table 1636 has the same configuration as that of the time correction history table 128 of the first embodiment of this invention.

A time stamp correction program module 1633 is a program module having a function of reading various logs (hardware log, system log, and application log) from the log buffer 1632 to correct time stamps of logs. Correction of the time stamps of the logs is carried out by using time stamp correction data 1643 recorded in a time stamp correction history table 1637 as in the case of the first embodiment of this invention. Accordingly, the time stamp correction history table 1637 is configured as in the case of the time stamp correction history table 129 of the first embodiment of this invention.

The logs whose time stamps have been corrected are read by a consistency check program module 1634, and consistency is checked according to a rule registered in a consistency rule database 1635. The consistency rule database 1635 includes a time-sequential relation among logs as in the case of the consistency rule 124 of the first embodiment of this invention.

The consistency check program module 1634 returns, in addition to registration of a consistency check result 1641 among the logs in a discordance history table 1639, the logs to the time stamp correction program module 1633 when discordance occurs among the logs to control the time stamp correction program module 1633 to correct to the time stamps all over again, and sends the logs to the log store program 1650, the log analyze program 1651, and the analysis result output program 1652 when there is no problem in consistency. The discordance history table 1639 is configured as in the case of the discordance history table 130 of the first embodiment of this invention.

In the time correction history table 1636, time correction history is recorded from a time correction log by the same method as that shown in FIGS. 6A and 6B. In the discordance history table 1639, discordance history is recorded from a consistency check result 1641 by the same method as that of FIG. 7. A time stamp correction history table update program module 1638 reads time correction history data 1640 from the time correction history table 1636, and discordance history data 1642 from the discordance history table 1639 to update the time stamp correction history table 1637 by the same method as that of the first embodiment of this invention shown in FIGS. 8 to 10.

A method for correcting time stamps by using the time stamp correction history table 1637 is similar to that of the first embodiment of this invention shown in FIGS. 8 to 10. In this case, time stamp correction data 1643 is sent from the time stamp correction history table 1637 to a time stamp correction program module. The time stamp correction data 1643 includes data corresponding to the index time 712, the offset value 713, and the inclination correction amount 714 shown in FIGS. 8 and 9. An operation of the time stamp correction program module 1633 is similar to that shown in the flowchart of FIG. 10.

Accordingly, the time stamp correction program 1631 can correct the time stamps of the logs generated, output and sent by the log analysis target system 1601 to consistent time stamps. The log analysis apparatus 1630 can store the logs recording the corrected time stamps by the log store program 1650, execute predetermined analysis for the logs by the log analyze program 1651, and output an analysis result by the analysis result output program 1652.

Though not shown in FIG. 18, time stamp rewinding can be prevented by the same method as that of the first embodiment shown in FIGS. 12 and 13. Specifically, a rewind protection program module having the same function as that of the rewind protection unit 1101 of FIG. 12 is inserted between the time stamp correction program module 1633 and the consistency check program module 1634 in FIG. 18 to prevent rewinding of the time stamps of the logs corrected by the time stamp correction program module 1633.

In this case, a table similar to the time stamp correction value history table 1102 shown in FIG. 12 is coupled to the rewind protection program module to check whether time of a corrected time stamp is before that of a previous last time stamp, and rewinding of the time stamp is prevented by the same operation as that of the flowchart shown in FIG. 13.

By the same method as that shown in FIGS. 15 and 16, time correction of the computer 1601 can be executed when discordance occurs. Specifically, a time correction command issue program module having the same function as that of the time correction command issue unit 1301 shown in FIG. 15 is inserted into a portion of receiving a result of the consistency check program module 1634 in FIG. 18. When discordance occurs in the consistency check program module 1634, the time correction command issue program module generates a time correction command for controlling the computer 1602 to execute time correction.

Though not shown in FIG. 18, a command receive program module having the same function as that of the command receive unit 1303 shown in FIG. 15 is inserted into the time correction unit 1604 to enable reception of a time correction command from the time correction command issue program module via the network 1620. This way, the computer 1602 can execute time correction when discordance occurs among the logs. The operations of generation, issuance, and execution of the time correction command are similar to those of the flowchart shown in FIG. 16.

Thus, according to the second embodiment of this invention, as in the case of the first embodiment of this invention, a progress status of a process carried out in the log analysis target system 1601 or an operation situation of the system can be correctly understood. Especially, a phantom emerging in a statistical index based on logs due to discontinuity generated in the time stamps during time correction of the computer 1602 or shifting of the time stamps gradually increased/decreased among the plurality of logs can be prevented.

As described above, a progress status of a process carried out in the cluster system using the plurality of logs output from the plurality of computers can be understood, and accuracy of understanding of a system operation situation can be improved. As a result, this invention can be used as a basic technology for system operation management tools and the like.

While the present invention has been described in detail and pictorially in the accompanying drawings, the present invention is not limited to such detail but covers various obvious modifications and equivalent arrangements, which fall within the purview of the appended claims.

What is claimed is:

1. A log analysis method for receiving, by a log analyze unit executed by a processor, logs including time stamps from a plurality of computers, and correcting the time stamps by the processor for executing the log analyze unit to analyze the logs, comprising the steps of:

generating, by the plurality of computers, a first log including time correction amount and a time stamp at a time of correcting time;

generating, by the plurality of computers, a second log including a time stamp in a log regarding a process or an operation;

transmitting, by the plurality of computers, the first log and the second log;

receiving, by the log analyze unit, the first log and the second log;

storing, by the log analyze unit, the first log in a time correction history storage;

calculating, by the log analyze unit, first time correction amount based on the first log;

correcting, by the log analyze unit, the time stamp of the second log based on the first time correction amount and second time correction amount;

determining, by the log analyze unit, whether, for a plurality of second logs whose time stamps have been corrected, a time-sequential order relation among the plurality of second logs satisfies a preset consistency rule;

obtaining, when the time-sequential order relation among the plurality of second logs does not satisfy the preset consistency rule, by the log analyze unit, the second time correction amount from a difference among time stamps of the plurality of second logs;

correcting the time stamps of second logs which do not satisfy the preset consistency rule again based on the first time correction amount and the second time correction amount;

determining whether the second logs whose time stamps have been corrected again satisfy the preset consistency rule again;

storing second logs which satisfy the preset consistency rule; and analyzing the stored second logs.

2. The log analysis method according to claim 1, wherein the step of calculating the first time correction amount calculates the first time correction amount based on a plurality of the first logs stored in the time correction history storage for each identifier of the plurality of computers which have generated the received first logs.

3. The log analysis method according to claim 1, wherein the step of obtaining the second time correction amount comprises the steps of:

obtaining amounts of shifting from the preset consistency rule of the time stamps of the second logs which do not satisfy the preset consistency rule as amounts of discordance;

storing time of determining that the second logs do not satisfy the preset consistency rule, names of the second logs, and the amounts of discordance in a discordance history storage; and calculating a value that eliminates the discordance of the time stamps of the second logs determined not to satisfy the preset consistency rule as the second time correction amount from at least one of the stored amounts of discordance.

4. The log analysis method according to claim 1, wherein:

the step of calculating the first time correction amount comprises the steps of:

calculating, for each identifier of the plurality of computers which have generated the received first logs, the first time correction amount based on the plurality of the first logs stored; and storing time indicated by the time stamps of the plurality of the first logs and the first time correction amount as history of first correction amount in time stamp correction history;

the step of obtaining the second time correction amount comprises the steps of:

obtaining amounts of shifting from the preset consistency rule of the time stamps of the second logs which do not satisfy the preset consistency rule as amounts of discordance;

calculating a value which eliminates discordance of the time stamps of the second logs determined not to satisfy the preset consistency rule as second time correction amount based on the amounts of discordance; and storing time of determining that the second logs do not satisfy the preset consistency rule, names of the second logs, and the second time correction in the time stamp correction history; and the step of correcting the time stamps of the second log comprises the steps of:

retrieving time of the time stamp correction history within a range not exceeding time indicated by the time stamps of the second logs, and obtaining the first time correction amount and the second time correction amount; and correcting the time stamps of the second logs to time after a time stamp of a last second log based on the obtained first time correction amount and the obtained second time correction amount.

5. The log analysis method according to claim 1, further comprising the steps of:
  setting, among the first logs of the plurality of computers, a first log for calculating first time correction amount;
  setting, among the second logs of the plurality of computers, a second log for correcting a time stamp; and
  setting the preset consistency rule.

6. The log analysis method according to claim 1, further comprising the step of transmitting, when the time-sequential order relation among the second logs does not satisfy the preset consistency rule, a command of correcting time to reference time to the plurality of computers which have generated the second logs.

7. The log analysis method according to claim 1, wherein the plurality of computers comprise virtual computers.

8. A log analysis apparatus for receiving logs and correcting time stamps of the logs to analyze the logs, comprising:
  a plurality of computers for generating and transmitting logs including time stamps, the log analysis apparatus receiving the logs from the plurality of computers;
  a memory;
  a processor;
  a log receive unit for receiving a first log including time correction amount and a time stamp from the plurality of computers at a time of correcting time, and a second log including a time stamp in a log regarding a process or an operation;
  a first time correction amount setting unit for calculating first time correction amount based on the first log, and storing time of the time stamp of the first log and the first time correction amount in a time stamp correction history store unit;
  a consistency rule storage for storing a time-sequential order relation among a plurality of second logs from the plurality of computers as a preset consistency rule;
  a second time correction amount setting unit for calculating, if the time-sequential order relation among the plurality of second logs does not satisfy the preset consistency rule, second time correction amount from a difference of time stamps of the plurality of second logs, and storing time of the time stamps of the plurality of second logs and the second time correction amount in the time stamp correction history store unit;
  a time stamp correction unit for correcting, based on the first time correction amount and the second time correction amount stored in the time stamp correction history store unit, the time stamps of the plurality of second logs;
  a consistency check unit for determining whether a time-sequential order relation of a plurality of second logs whose time stamps have been corrected satisfies the preset consistency rule;
  a log store unit for storing the second logs which satisfy the preset consistency rule; and
  a log analyze unit for analyzing the stored second logs, wherein:
  the second time correction amount setting unit calculates the second time correction amount based on a determination result of the consistency check unit; and
  the consistency check unit transmits second logs which do not satisfy the preset consistency rule again to the time stamp correction unit.

9. The log analysis apparatus according to claim 8, wherein the first time correction amount setting unit stores the received first logs in a time correction history storage for each identifier of the plurality of computers which have generated the first logs, and calculating the first time correction amount based on the plurality of first logs stored in the time correction history storage.

10. The log analysis apparatus according to claim 8, wherein the second time correction amount setting unit is configured to:
  obtain amounts of shifting from the preset consistency rule of the time stamps of the second logs which do not satisfy the preset consistency rule as amounts of discordance;
  store time of determining that the second logs do not satisfy the preset consistency rule, names of the second logs, and the amounts of discordance in a discordance history storage; and
  calculate a value that eliminates the discordance of the time stamps of the second logs determined not to satisfy the preset consistency rule as the second time correction amount from at least one of the amounts of discordance stored in the discordance history storage.

11. The log analysis apparatus according to claim 8, wherein:
  the first time correction amount setting unit stores the received first logs in the time correction history storage for each identifier of the plurality of computers which have generated the first logs, calculating the first time correction amount based on the plurality of received first logs, and storing time indicated by the time stamps of the first logs and the first time correction amount as history of first correction amount in time stamp correction history;
  the second time correction amount setting unit obtains amounts of shifting from the preset consistency rule of the time stamps of the second logs which do not satisfy the preset consistency rule as amounts of discordance, calculates, based on the amounts of discordance, a value which eliminates discordance of the time stamps of the second logs determined not to satisfy the preset consistency rule as second time correction amount, and stores time of determining that the second logs do not satisfy the preset consistency rule, names of the second logs, and the second time correction amount in the time stamp correction history; and
  the time stamp correction unit is configured to:
    retrieve time of the time stamp correction history within a range not exceeding time indicated by the time stamps of the second logs to obtain the first time correction amount and the second time correction amount; and
    correcting the time stamp of the second log to time after a time stamp of a last second log based on the obtained first time correction amount and the obtained second time correction amount.

12. The log analysis apparatus according to claim 8, further comprising:
  a first interface for setting, among the first logs of the plurality of computers, a first log for calculating first time correction amount;
  a second interface for setting, among the second logs of the plurality of computers, a second log for correcting a time stamp; and
  a third interface for setting the preset consistency rule.

13. The log analysis apparatus according to claim 8, further comprising a time correction command unit for transmitting, when the time-sequential order relation among the second logs does not satisfy the preset consistency rule, a command of correcting time to reference time to the plurality of computers which have generated the second logs.

14. The log analysis apparatus according to claim 8, wherein the plurality of computers comprise virtual computers.

* * * * *